(12) United States Patent
Itagaki et al.

(10) Patent No.: US 11,425,715 B2
(45) Date of Patent: Aug. 23, 2022

(54) COMMUNICATION APPARATUS AND COMMUNICATION METHOD

(71) Applicant: Sony Corporation, Tokyo (JP)

(72) Inventors: Takeshi Itagaki, Saitama (JP); Kazuyuki Sakoda, Chiba (JP); Tomoya Yamaura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 36 days.

(21) Appl. No.: 17/072,037

(22) Filed: Oct. 16, 2020

(65) Prior Publication Data

US 2021/0051657 A1 Feb. 18, 2021

Related U.S. Application Data

(63) Continuation of application No. 15/508,803, filed as application No. PCT/JP2015/072072 on Aug. 4, 2015, now Pat. No. 10,834,721.

(30) Foreign Application Priority Data

Oct. 31, 2014 (JP) .............................. JP2014-223538

(51) Int. Cl.
*H04W 72/04* (2009.01)
*H04L 1/00* (2006.01)
(Continued)

(52) U.S. Cl.
CPC ......... *H04W 72/0446* (2013.01); *H04L 1/009* (2013.01); *H04L 5/0048* (2013.01); *H04W 28/06* (2013.01); *H04W 84/12* (2013.01)

(58) Field of Classification Search
CPC . H04W 72/0446; H04W 28/06; H04W 84/12; H04L 1/009; H04L 5/0048
(Continued)

(56) References Cited

U.S. PATENT DOCUMENTS

2007/0280173 A1* 12/2007 Jo .................. H04L 25/0226
370/338
2011/0188598 A1 8/2011 Lee et al.
(Continued)

FOREIGN PATENT DOCUMENTS

CN 1951069 A 4/2007
CN 103001816 A 3/2013
(Continued)

OTHER PUBLICATIONS 802.11-2012 (Year: 2012).*
(Continued)

*Primary Examiner* — Yemane Mesfin
*Assistant Examiner* — Intekhaab A Siddiquee
(74) *Attorney, Agent, or Firm* — Xsensus LLP

(57) ABSTRACT

[Object] To provide a communication apparatus and a communication method which are capable of reducing the overhead of communication while suppressing influence on the frame reception process.
[Solution] Provided is a communication apparatus, including: a processing unit configured to select one of a frame of a first format including a training signal and a frame of a second format not including a first field which is at least a part of the training signal, and generate the frame of the selected format; and a communication unit configured to transmit the frame of the first format or the frame of the second format. Also provided is a communication method, including: selecting one of a frame of a first format including a training signal and a frame of a second format not including a first field which is at least a part of the training signal, and generating the frame of the selected format; and transmitting the frame of the first format or the frame of the second format.

20 Claims, 26 Drawing Sheets

(51) Int. Cl.
*H04L 5/00* (2006.01)
*H04W 28/06* (2009.01)
*H04W 84/12* (2009.01)

(58) Field of Classification Search
USPC .......................................................... 370/338
See application file for complete search history.

(56) References Cited

U.S. PATENT DOCUMENTS

| | | | |
|---|---|---|---|
| 2012/0177017 A1* | 7/2012 | Gong | H04W 74/0816 370/338 |
| 2012/0269069 A1 | 10/2012 | Porat et al. | |
| 2012/0269124 A1 | 10/2012 | Porat | |
| 2012/0269125 A1 | 10/2012 | Porat et al. | |
| 2012/0269142 A1 | 10/2012 | Porat et al. | |
| 2012/0327871 A1 | 12/2012 | Ghosh et al. | |
| 2013/0315342 A1* | 11/2013 | Um | H04L 27/2613 375/295 |
| 2013/0329680 A1 | 12/2013 | Lee et al. | |
| 2015/0036674 A1 | 2/2015 | Lee et al. | |
| 2015/0341197 A1 | 11/2015 | Porat et al. | |
| 2016/0007342 A1* | 1/2016 | Seok | H04L 27/2602 370/338 |

FOREIGN PATENT DOCUMENTS

| | | | | |
|---|---|---|---|---|
| JP | 2008-500765 A | 1/2008 | | |
| JP | 2013-518503 A | 5/2013 | | |
| KR | 201201086859 A | 9/2012 | | |
| WO | 2013/169389 A1 | 11/2013 | | |
| WO | WO-2013181852 A1 * | 12/2013 | ............ | H04W 48/12 |
| WO | WO-2016040782 A1 * | 3/2016 | ........... | H04B 7/0617 |

OTHER PUBLICATIONS

Extended European Search Report dated May 25, 2018 in corresponding European Patent Application No. 15854869.3, 9 pages.
International Search Report dated Oct. 27, 2015, in PCT/JP2015/072072 filed Aug. 4, 2015.
Office Action and Search Report issued in Chinese Application 201580057291.0 dated Nov. 5, 2019.
Shantanu Shrivastava et al., "Overhearing Packet Transmissions to Reduce Preamble Overhead and Improve Throughput in IEEE 802.11 Networks", 2014 (COMSNETS), Sixth International Conference on Communication Systems and Networks, IEEE XP32564090, Jan. 6, 2014, pp. 1-8.
IEEE Standards Association, IEEE Standard for Information technology—Telecommunication and information exchange between systems Local and metropolitan area networks—Specific requirements, "Part 11 : Wireless LAN Medium Access Control (MAC) and Physical Layer (PHY) Specifications", IEEE Std. No. 802.11 ™, (2012), 2791 pages.
Anonymous: "RACH", ShareTechnote.com, Oct. 21, 2014, pp. 1-26, XP055857855, Retrieved from the Internet: URL:https://web.archive.org/web/20141021231310/https://www.sharetechnote.com/html/RACH_LTE.html#RACH_Process_Overview_In_Diagrams [retrieved on Nov. 4, 2021].

* cited by examiner

FIG. 2B

| L-STF | L-LTF | L-SIG | Ext-SIG | Ext-STF | Ext-LTFs | Service | PSDU |

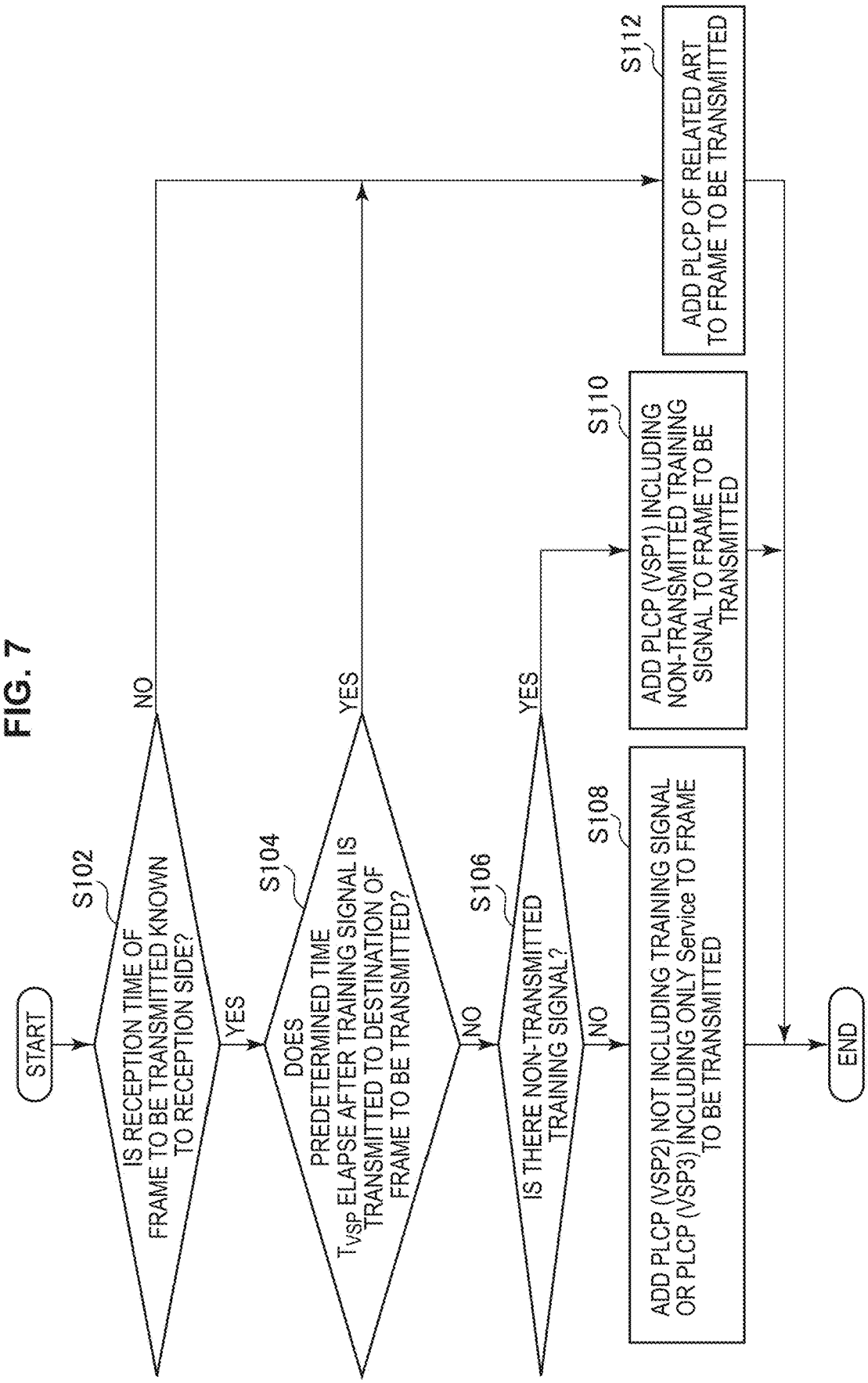

COMMUNICATION APPARATUS AND COMMUNICATION METHOD

CROSS-REFERENCE TO RELATED APPLICATIONS

The present application is a continuation of U.S. application Ser. No. 15/508,803, filed Mar. 3, 2017, which is based on PCT filing PCT/JP2015/072072, filed on 4 Aug. 2015, and claims priority to Japanese Patent Application No. 2014-223538, filed on Oct. 31, 2014, the entire contents of each are incorporated herein by its reference.

TECHNICAL FIELD

The present disclosure relates to communication apparatuses and communication methods.

BACKGROUND ART

Wireless local area networks (LANs), typified by IEEE (Institute of Electrical and Electronics Engineers) 802.11, have in recent years been widespread.

802.11 is a random access type wireless communication standard, and in 802.11, when a plurality of communication apparatuses perform transmission asynchronously, a mechanism such as carrier sense multiple access (CSMA)/collision avoidance (CA) is employed to suppress a decrease in throughput of communication due to collision of transmission packets. Specifically, a communication apparatus conforming to 802.11 checks a state of a channel before performing packet transmission and delays the packet transmission when other packets are detected.

Here, in 802.11, a known signal sequence called a physical layer convergence protocol (PLCP) preamble is used to detect a packet transmitted from another communication apparatus. Specifically, detection of a packet is performed by correlating a signal sequence of a received packet with a known signal sequence.

However, information amounts of content to be transmitted and the number of products supporting a wireless LAN are continuously increasing, and thus it is desirable to further improve communication throughput.

Here, the PLCP preamble is used for processes for reception of packets, for example, detection of a start timing of a packet, gain adjustment of a communication apparatus at a reception side, channel estimation, correction of a frequency offset, and the like. However, when packets can be received without performing the above processes, an unnecessary PLCP preamble is transmitted, and the overhead of communication increases.

On the other hand, there is a technique of reducing the overhead of communication by the PLCP preamble. For example, in Non-Patent Literature 1, a green field format is defined as a PLCP format, and a training signal for securing backward compatibility is not included in the PLCP of the format. The overhead of communication is reduced accordingly.

CITATION LIST

Non-Patent Literature

Non-Patent Literature 1: 802.11 2012 IEEE Standard for Information technology-Telecommunications and information exchange between systems Local and metropolitan area networks-Specific requirements Part 11: Wireless LAN Medium Access Control (MAC) and Physical Layer (PHY) Specifications

DISCLOSURE OF INVENTION

Technical Problem

However, even in the case of the green field format, since other training signals are included, there are cases in which an unnecessary PLCP preamble is transmitted.

In this regard, the present disclosure proposes a communication apparatus and a communication method, which are novel and improved and capable of reducing the overhead of communication while suppressing influence on a frame reception process.

Solution to Problem

According to the present disclosure, there is provided a communication apparatus, including: a processing unit configured to select one of a frame of a first format including a training signal and a frame of a second format not including a first field which is at least a part of the training signal, and generate the frame of the selected format; and a communication unit configured to transmit the frame of the first format or the frame of the second format.

According to the present disclosure, there is provided a communication apparatus, including: a communication unit configured to receive a frame of a first format including a training signal and a frame of a second format not including a first field which is at least a part of the training signal.

According to the present disclosure, there is provided a communication method, including: selecting one of a frame of a first format including a training signal and a frame of a second format not including a first field which is at least a part of the training signal, and generating the frame of the selected format; and transmitting the frame of the first format or the frame of the second format.

Advantageous Effects of Invention

As described above, according to the present disclosure, a communication apparatus and a communication method which are capable of reducing the overhead of communication while suppressing influence on a frame reception process are provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 2B is a diagram illustrating a frame format supported by 802.11a/g.

FIG. 7 is a flowchart conceptually illustrating a PLCP selection process of a communication apparatus according to the present embodiment.

MODE(S) FOR CARRYING OUT THE INVENTION

Figure 1:
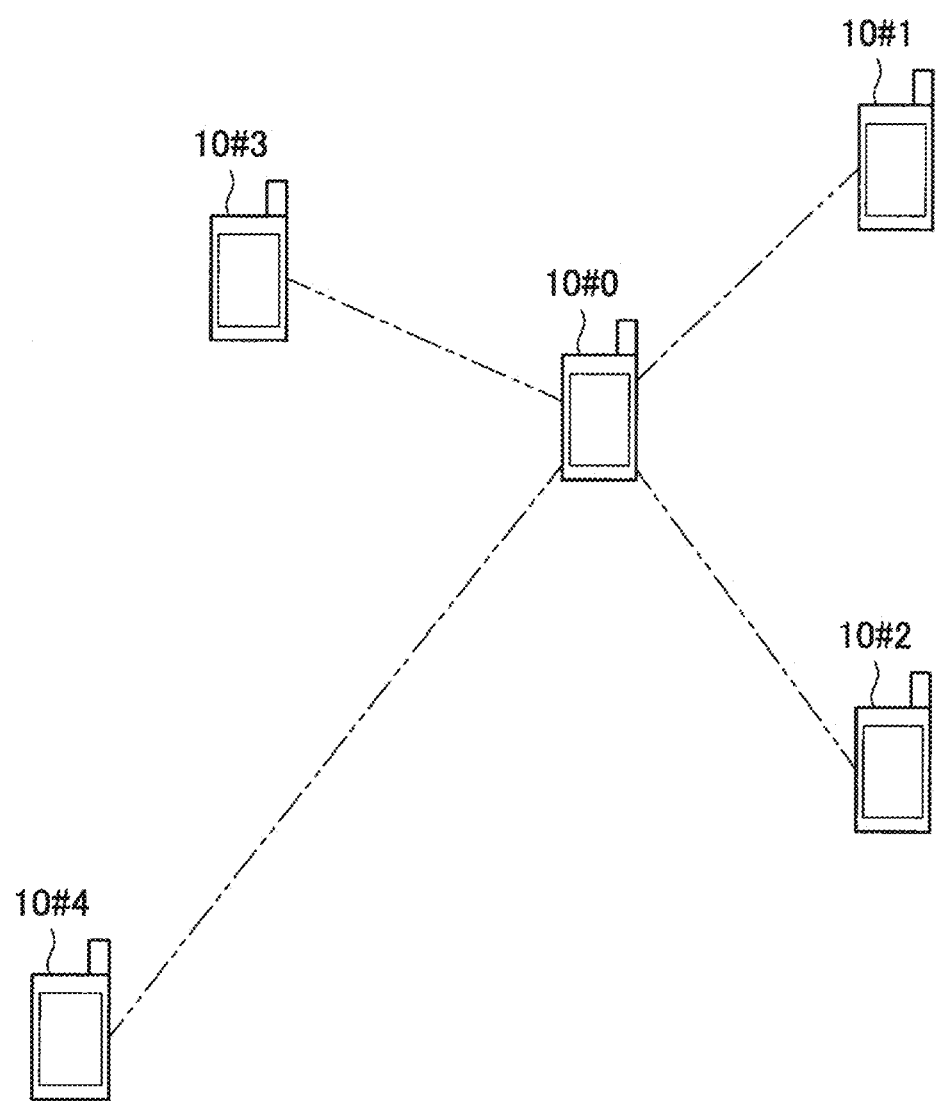
FIG. 1 is a diagram illustrating an example configuration of a communication system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, description will proceed in the following order.
1. Overview of information system related to one embodiment of present disclosure
2. First embodiment (example in which PLCP is autonomously selected)
3. Second embodiment (example in which requested PLCP is selected)
4. Third embodiment (example in which PLCP is selected in space division multiplexing communication)
5. fourth embodiment (example in which PLCP is selected in frequency division multiplexing communication)
6. Application examples
7. Conclusion

1. OVERVIEW OF INFORMATION SYSTEM ACCORDING TO EMBODIMENT OF PRESENT DISCLOSURE

Firstly, an overview of a communication system according to an embodiment of the present disclosure will be described with reference to FIG. 1. FIG. 1 is a diagram illustrating an example configuration of the communication system of the embodiment of the present disclosure.

The communication system is configured with a plurality of communication apparatuses 10. The communication apparatuses 10 have a wireless communication function and operate as access points (APs) or terminals. Hereinafter, a communication apparatus 10 operating as an AP will also be referred to as a master unit, and communication apparatuses 10 operating as terminals will be referred to as slave units. For this reason, in the communication system, communication is possible between the master unit and the slave units. Here, communication from the master unit to the slave units is referred to as downlink (DL) communication, and communication from the slave units to the master unit is referred to as uplink (UL) communication.

For example, as shown in FIG. 1, the communication system may include a plurality of communication apparatuses 10#0 to 10#4. The communication apparatus 10#0 which is a master unit and the communication apparatuses 10#1 to 10#4 which are slave units are connected through wireless communication and directly transmit and receive frames to and from each other.

Figure 2A:
FIG. 2A is a diagram illustrating a frame format of a mixed mode supported by 802.11n/ac.

Here, in the 802.11 standard, the PLCP preamble used for the frame reception process is added to the frames to be transmitted/received. A configuration of a frame according to a related art will be described with reference to FIGS. 2A and 2B. FIG. 2A is a diagram illustrating a format of a frame supported by 802.11a/g (hereinafter, also referred to as a "legacy mode frame"), and FIG. 2B is a diagram illustrating a frame format of a mixed mode supported by 802.11n/ac.

First, as illustrated in FIG. 2A, the legacy mode frame is configured with a legacy long training field (L-STF), a legacy short training field (L-LTF), a legacy signal field (L-SIG), a Service, and a physical layer service data unit (PSDU).

Further, as illustrated in FIG. 2B, the mixed mode frame is configured with an L-STF, an L-LTF, an L-SIG, an Ext-SIG, an Ext-STF, an Ext-LTF, a Service, and a PSDU. The Ext-STF or the like may be a high throughput (HT)-STF, a very high throughput (VHT)-STF, or the like.

Figure 3:
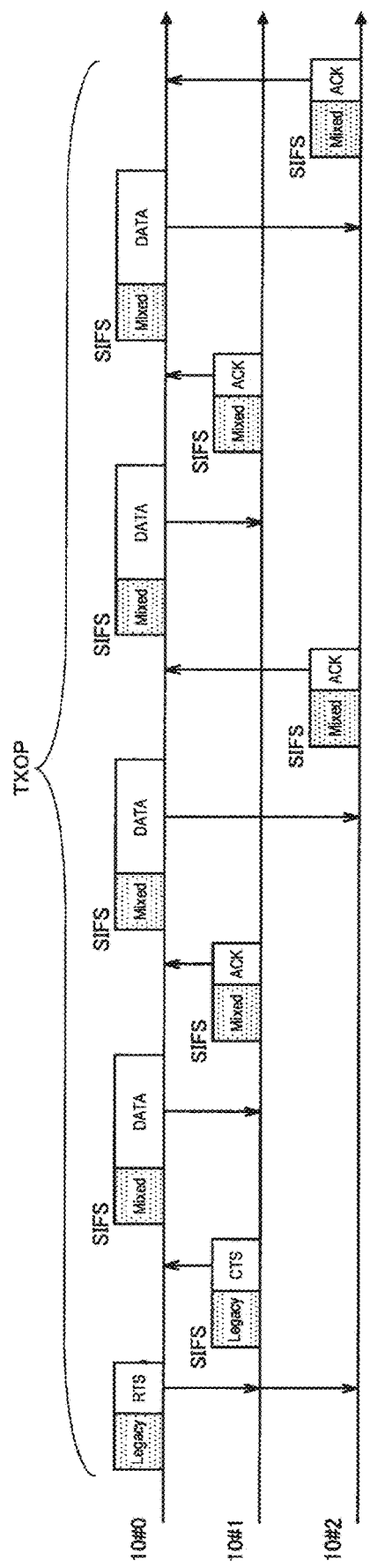
FIG. 3 is a diagram illustrating a frame exchange sequence according to a related art.

As described above, the mixed mode has the PLCP preamble such as the L-STF in order to secure the backward compatibility with the legacy mode. A PLCP used in frame exchange according to a related art will be described with reference to FIG. 3. FIG. 3 is a diagram illustrating a frame exchange sequence according to a related art.

First, the master unit transmits a legacy mode transmission permission request frame. For example, as illustrated in FIG. 3, the master unit 10#0 transmits a request to send (RTS) frame to which the PLCP of the legacy mode is added to slave units 10#1 and 10#2.

Then, the slave unit that has received the transmission permission request frame transmits a legacy mode transmission permission frame to the master unit. For example, as illustrated in FIG. 3, the slave unit 10#1 transmits a clear to send (CTS) frame to which the PLCP of the legacy mode is added to the master unit 10#0.

Then, the master unit that has received the transmission permission frame transmits a mixed mode data frame to the slave unit. For example, as illustrated in FIG. 3, the master unit 10#0 transmits a data frame to which the PLCP of the mixed mode is added to the slave unit 10#1. Thereafter, the PLCP of the mixed mode is added to each frame to be transmitted.

Since the PLCP preamble is added to the frame each time communication is performed as described above, when a frame can be received without performing the frame reception process using the PLCP preamble, an unnecessary PLCP preamble is transmitted. For this reason, the overhead of communication is likely to increase.

On the other hand, a frame of a green field format defined by 802.11n (hereinafter, also referred to as a "green field mode frame") does not include a signal such as the L-STF in order to secure the backward compatibility with the legacy mode, unlike the mixed mode. However, even in the case of the green field mode frame, since the PLCP preamble such as the HT-STF is included, there is room for improvement in communication efficiency.

In this regard, the present disclosure proposes a communication apparatus and a communication method which are capable of reducing the overhead of communication while suppressing influence on the frame reception process. Details thereof will be described below. Here, although an example of a communication system in which the communication apparatus 10#0 is a master unit is described in FIG. 1, another communication apparatus 10 may be a master unit, or the communication apparatus 10#0 may be a communication apparatus having a plurality of direct links with other communication apparatuses 10#1 to 10#4. In the latter case, the aforementioned UL may be replaced with "simultaneous transmission from one unit to a plurality of units," and the aforementioned UL may be replaced with "simultaneous transmission from a plurality of units to one unit." Also, for convenience of description, communication apparatuses 10 according to first to fourth embodiments are distinguished by attaching numbers corresponding to the embodiments to the ends thereof, such as a communication apparatus 10-1 and a communication apparatus 10-2.

2. FIRST EMBODIMENT (EXAMPLE IN WHICH PLCP IS AUTONOMOUSLY SELECTED)

The overview of the communication system according to one embodiment of the present disclosure has been described above. Next, a communication apparatus 10-1 according to a first embodiment of the present disclosure will be described. The communication apparatus 10-1 according to the present embodiment autonomously selects the PLCP to be added to the frame to be transmitted. The selected PLCP is also called a PLCP of a related art or a PLCP which is shorter than the PLCP of the related art (hereinafter, also referred to as a "very short PLCP (VSP)").

2-1. Configuration of Communication Apparatus

Figure 4:
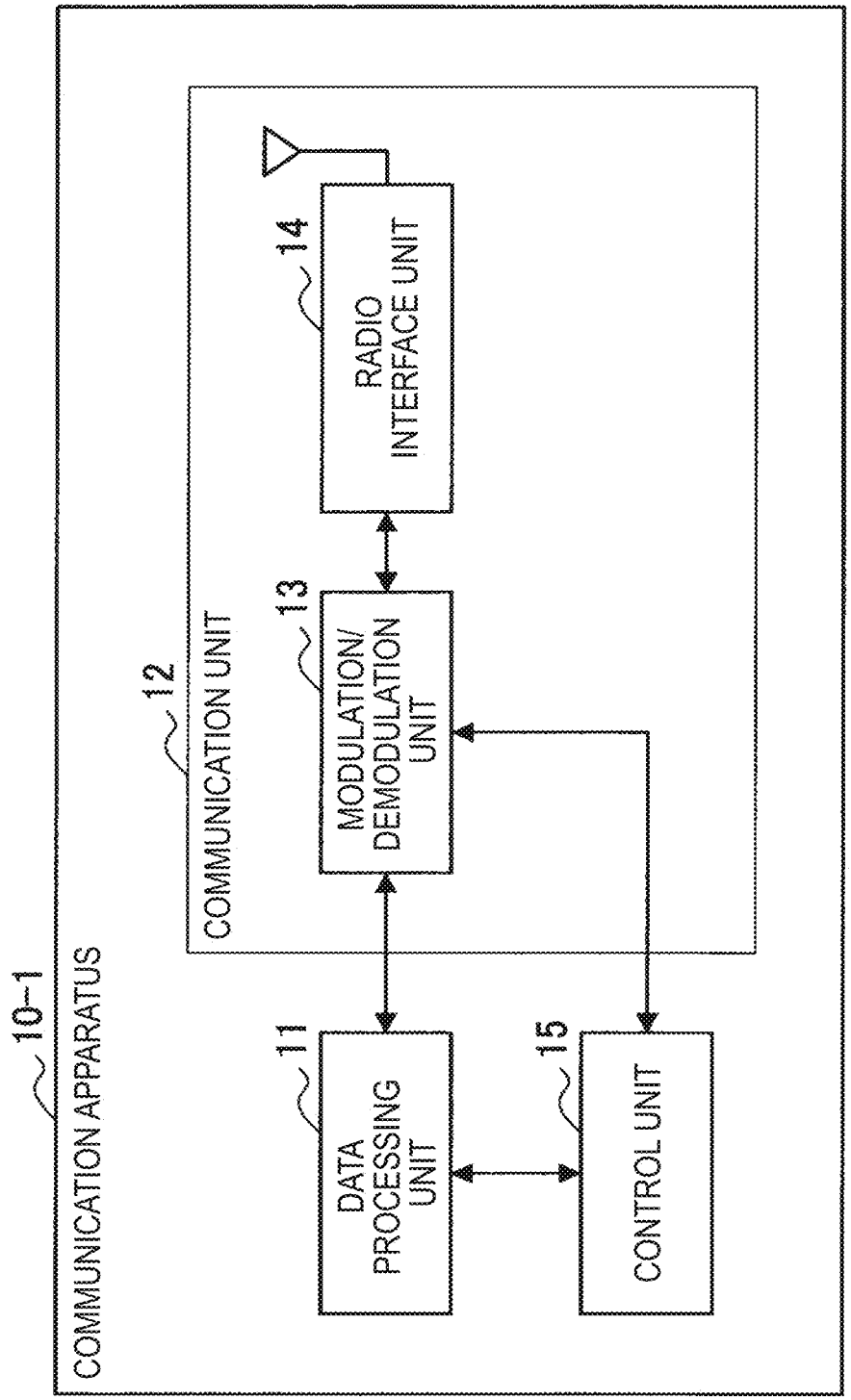
FIG. 4 is a block diagram illustrating a schematic functional configuration of a communication apparatus according to a first embodiment of the present disclosure.

Firstly, a configuration of the communication apparatus 10-1 according to the first embodiment of the present disclosure will be described with reference to FIG. 4. FIG. 4 is a block diagram schematically illustrating a functional configuration of the communication apparatus 10-1 of the first embodiment of the present disclosure.

As illustrated in FIG. 4, the communication apparatus 10-1 includes a data processing unit 11, a communication unit 12, and a control unit 15. Firstly, basic functions of the communication apparatus 10-1 will be described.
((Basic Functions))

The data processing unit 11 performs a process for transmission and reception of data. Specifically, the data processing unit 11 generates a frame on the basis of data from a higher-level layer of communication, and provides the generated frame to a modulation/demodulation unit 13 described below. For example, the data processing unit 11 generates a frame (or packets) from data, and performs processes, such as addition of a MAC header for media access control (MAC), addition of an error detection code, and the like, on the generated frame. The data processing unit 11 also extracts data from a received frame, and provides the extracted data to a higher-level layer of communication. For example, the data processing unit 11 obtains data by performing, on a received frame, analysis of a MAC header, detection and correction of code error, a reordering process, and the like As illustrated in FIG. 4, the communication unit 12 includes a modulation/demodulation unit 13 and radio interface units 14.

The modulation/demodulation unit 13 performs a modulation process and the like on a frame. Specifically, the modulation/demodulation unit 13 performs encoding, interleaving, and modulation on a frame provided by the data processing unit 11, in accordance with coding and modulation schemes and the like set by the control unit 15, to generate a symbol stream. Thereafter, the modulation/demodulation unit 13 provides the generated symbol stream to the radio interface unit 14. The modulation/demodulation unit 13 also performs demodulation and decoding or the like on the symbol stream provided by radio interface unit 14 to obtain a frame, and provides the obtained frame to the data processing unit 11 or the control unit 15.

The radio interface unit 14, which includes an antenna, transmits and receives a signal through the antenna. Specifically, the radio interface unit 14 converts a signal contained in a symbol stream provided from the modulation/demodulation unit 13, into an analog signal, and performs amplification, filtering, and frequency upconversion on the analog signal. Thereafter, the radio interface unit 14 transmits the processed signal through the antenna. The radio interface unit 14 also performs, on a signal from the antenna, reverse processes to those which are performed for signal transmission, such as frequency downconversion, digital signal conversion, and the like, and provides the signal obtained by the processes to the modulation/demodulation unit 13.

Further, two or more radio interface units 14 may be provided. Hereinafter, the modulation/demodulation unit 13 and the radio interface unit 14 are collectively referred to as a "communication unit 12."

The control unit 15 controls an overall operation of the communication apparatus 10-1. Specifically, the control unit 15 transfers information between each function, sets communication parameters, and schedules frames (or packets) in the data processing unit 11, for example.

(Parameter Decision Function)

The control unit 15 decides a parameter used in the PLCP selection process. Specifically, the control unit 15 decides a time in which a communication synchronization error with a communication link destination falls within a predetermined range. A communication synchronization target in the present disclosure will be described later.

More specifically, when a communication link is established, the control unit 15 first determines whether the communication apparatus with which the communication link is established is the communication apparatus 10-1 corresponding to the VSP. For example, at the time of association, the control unit 15 makes an attempt to acquire information indicating that it is a VSP-supporting communication apparatus using an association request or response.

When the communication apparatus with which the communication link is established is determined not to be a communication apparatus supporting the VSP, the control unit 15 turns off a VSP setting. For example, when it is unable to acquire information indicating that the communication apparatus of the communication link destination is the communication apparatus supporting the VSP, the control unit turns off the VSP setting in communication with the communication apparatus, for example, sets it to disable or the like. When the information is acquired, the control unit 15 may turn on the VSP setting in communication with the communication apparatus, for example, set it to enable or the like.

Then, the control unit 15 calculates an estimated time length until the communication synchronization error falls within a predetermined range (hereinafter, also referred to as a "$T_{VSP}$ candidate time length"). Here, the communication synchronization error indicates, for example, a timing synchronization error with the communication apparatus 10-1 with which the communication link is established, a frequency synchronization error with the communication apparatus 10-1, and a channel estimation error with the communication apparatus 10-1. Then, the control unit 15 calculates a time length in which the timing synchronization error with the communication apparatus 10-1 with which the communication link is established is determined to fall within a predetermined range, a time length in which the frequency synchronization error with the communication apparatus 10-1 is determined to fall within a predetermined range, and a time length in which the channel estimation error with the communication apparatus 10-1 is determined to fall within a predetermined range. The control unit 15 may calculate only a part of the time length as the $T_{VSP}$ candidate time length.

Figure 5:
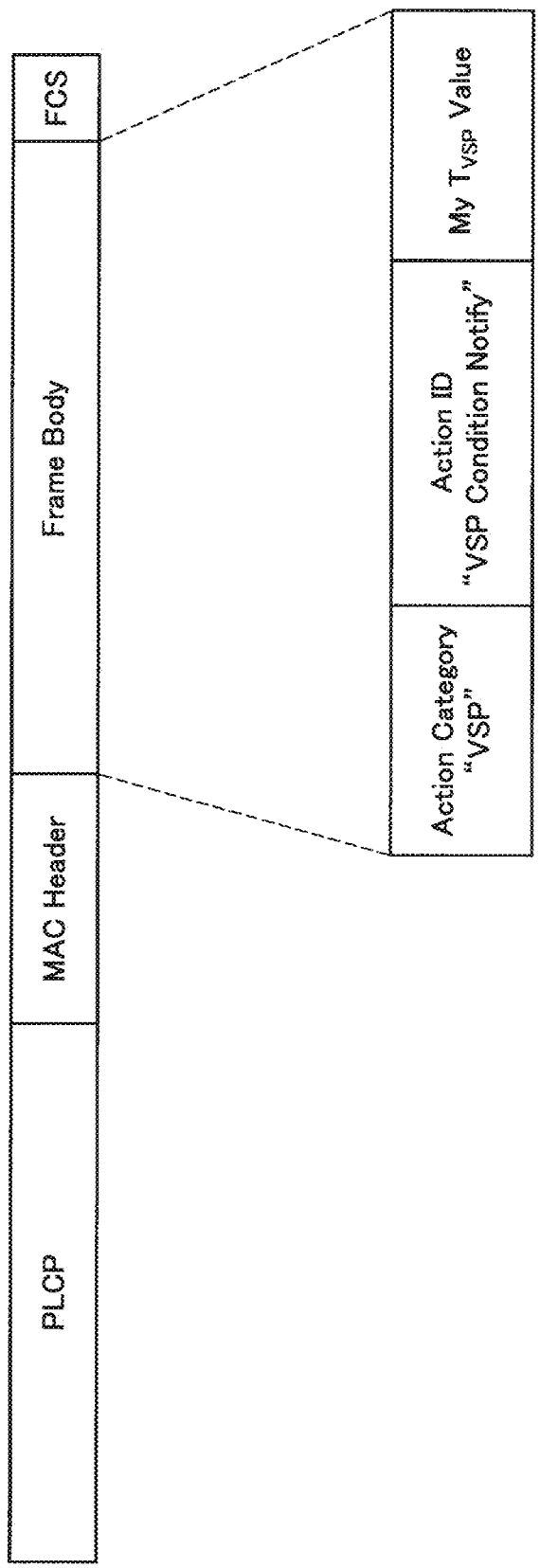
FIG. 5 is a diagram illustrating an example configuration of a frame including information indicating a $T_{VSP}$ candidate time length according to the present embodiment.

Then, the control unit 15 shares the calculated $T_{VSP}$ candidate time length with the communication apparatus with which the communication link is established. For example, the control unit 15 generates a frame including information indicating each of the calculated $T_{VSP}$ candidate time lengths (hereinafter, also referred to as a "$T_{VSP}$ exchange frame") to the data processing unit 11, and causes the communication unit 12 to transmit the $T_{VSP}$ exchange frame to the communication apparatus. Further, the $T_{VSP}$ exchange frame used for sharing of the $T_{VSP}$ candidate time length will be described with reference to FIG. 5. FIG. 5 is a diagram illustrating an example configuration of the $T_{VSP}$ exchange frame including the information indicating the $T_{VSP}$ candidate time length according to the present embodiment.

As illustrated in FIG. 5, the $T_{VSP}$ exchange frame is configured with a PLCP, a MAC header, a frame body, and a frame check sequence (FCS), and the information indicating the $T_{VSP}$ candidate time length may be stored in the frame body. For example, the information indicating the $T_{VSP}$ candidate time length may be configured with an Action Category, an Action ID (identification), and a My $T_{VSP}$ Value. For example, a category of information, for example, "VSP," is stored in the Action Category, a type of information within the category, for example, "VSP Condition Notify," is stored in the Action ID, and a value of the information, that is, the information indicating the $T_{VSP}$ candidate time length, is stored in the My $T_{VSP}$ Value.

Returning to the description of the configuration of the communication apparatus 10-1 according to the present embodiment with reference to FIG. 4, the control unit 15 then decides a time in which the communication synchronization error falls within a predetermined range on the basis of the time lengths received from the communication apparatus with which the communication link is established and the calculated time lengths. For example, the control unit 15 selects the time length shorter than other time lengths among the time lengths indicated by the information included in the received frame and the calculated time lengths as a predetermined time $T_{VSP}$ used in the PLCP selection process.

(PLCP Selection Function)

The control unit 15 selects the PLCP to be added to the frame to be transmitted as a part of the processing unit. Specifically, the control unit 15 selects the PLCP so that a frame including the training signal is generated as a frame of a first format, or a frame not including at least a part of the training signal is generated as a frame of a second format. For example, the control unit 15 selects either the PLCP of the related art or the VSP.

More specifically, the control unit 15 selects the VSP when a condition related to a transmission time of a frame serving as a first condition is satisfied. For example, the control unit 15 selects the VSP when a predetermined time does not elapse after a frame to which the PLCP of the related art is added (hereinafter, also referred to as an "original frame") is transmitted, and a transmission time of the frame to be transmitted is known to the destination of the frame to be transmitted. The transmission time may have a temporal width.

Figure 6A:
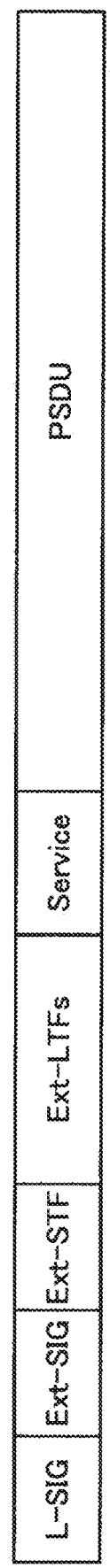
FIG. 6A is a diagram illustrating an example of a VSP frame in the present embodiment.
Figure 6B:
FIG. 6B is a diagram illustrating an example of a VSP frame having a shorter PLCP than the VSP frame illustrated in FIG. 6A according to the present embodiment.
Figure 6C:
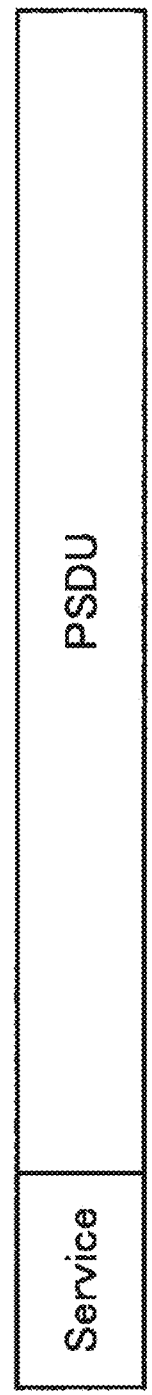
FIG. 6C is a diagram illustrating an example of a VSP frame having a shorter PLCP than the VSP frame illustrated in FIG. 6B according to the present embodiment.

The data processing unit 11 generates a frame on the basis of the PLCP selected by the control unit 15. Specifically, the data processing unit 11 generates the original frame or the frame to which the VSP is added (hereinafter, also referred to as a "VSP frame"). Further, a VSP frame generation process of the data processing unit 11 will be described with reference to FIGS. 6A and 6B. FIG. 6A is a diagram illustrating an example of a VSP frame according to the present embodiment, and FIG. 6B is a diagram illustrating an example of a VSP frame having a shorter PLCP than the VSP frame illustrated in FIG. 6A. Further, FIG. 6C is a diagram illustrating an example of a VSP frame having a shorter PLCP than the VSP frame illustrated in FIG. 6B.

The data processing unit 11 generates a frame in which the training signal for the backward compatibility is not included. For example, when the frame is transmitted to the destination of the legacy mode frame after the legacy mode frame is transmitted, the data processing unit 11 generates a VSP frame configured with a PLCP including an L-SIG, an Ext-SIG, an Ext-STF, an Ext-LTF, and a Service without including the L-STF and the like (hereinafter, also referred to as "VSP1") and a PSDU (hereinafter, also referred to as a "VSP1 frame") as illustrated in FIG. 6A.

Further, the data processing unit 11 generates a frame configured with a signal including information related to a data part of the frame and the data part. For example, when the mixed mode frame or the VSP1 frame is transmitted, and then the frame is further transmitted to the transmission destination of the frame, the data processing unit 11 generates a VSP frame configured with a PLCP including an SIG and a Service without including the entire training signal such as the L-STF or the Ext-STF (hereinafter, also referred to as "VSP2") and a PSDU (hereinafter, also referred to as a "VSP2 frame") as illustrated in FIG. 6B.

Further, the data processing unit 11 generates a frame configured with only the data part of the frame. For example, when the mixed mode frame or VSP1 frame is transmitted, and then the frame is further transmitted to the transmission destination of the frame, the data processing unit 11 generates a VSP frame configured with a PLCP including only a Service without including the entire training signal such as the L-STF or the Ext-STF and an SIG (hereinafter, also referred to as "VSP3") and a PSDU (hereinafter, also referred to as a "VSP3 frame") as illustrated in FIG. 6C.

(Reception Method Selection Function)

The communication unit 12 receives the frame serving as the frame of the first format including the training signal and the frame serving as the frame of the second format not including at least a part of the training signal. Specifically, the communication unit 12 performs the process of receiving the original frame and the VSP frame. Further, when a predetermined time elapses after the original frame is received, the communication unit 12 receives only the original frame.

2-2. Process of Communication Apparatus

Figure 8:
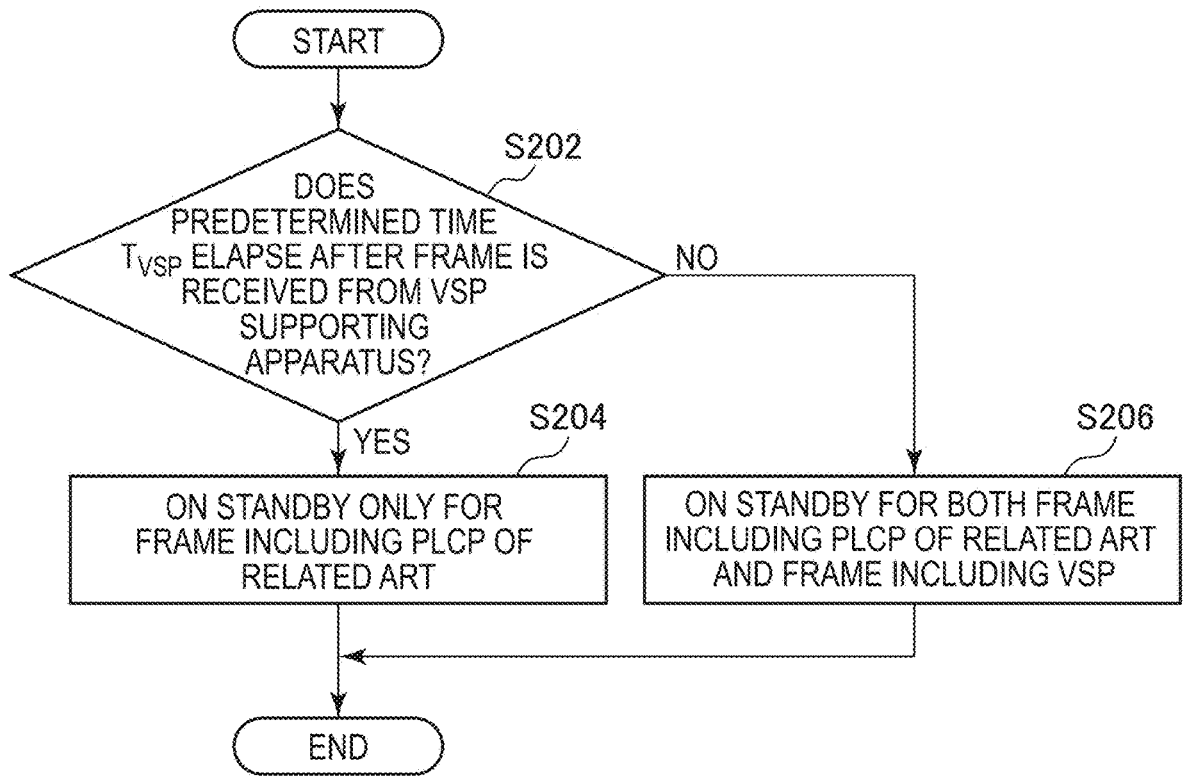
FIG. 8 is a flowchart conceptually illustrating a reception method selection process of a communication apparatus according to the present embodiment.
Figure 9:
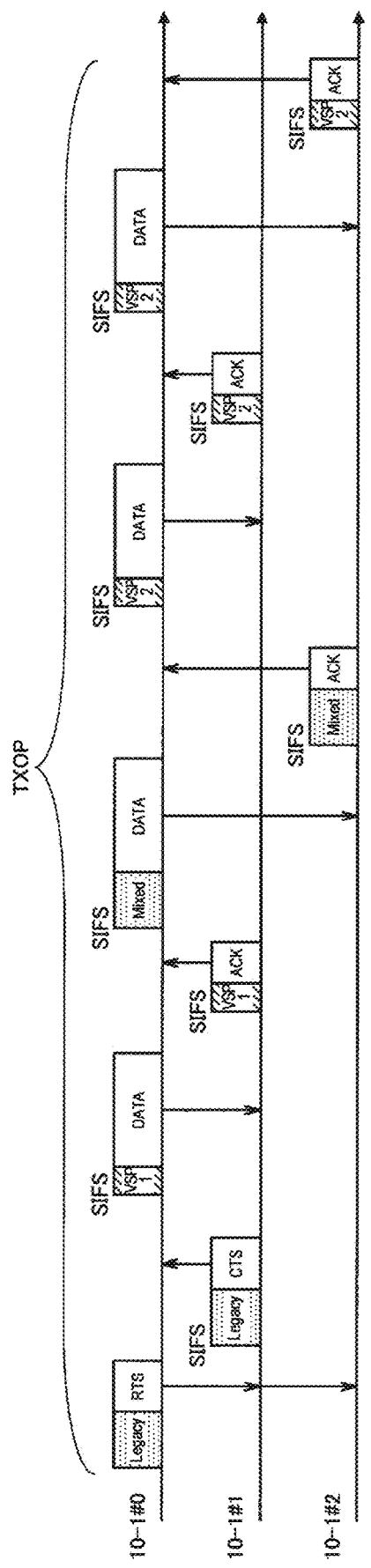
FIG. 9 is a diagram illustrating a frame exchange sequence performed in a communication system according to the present embodiment.

Next, a process of the communication apparatus 10-1 according to the present embodiment will be described with reference to FIGS. 7 to 9.

(PLCP Selection Process)

First, the PLCP selection process will be described with reference to FIG. 7. FIG. 7 is a flowchart conceptually illustrating the PLCP selection process of the communication apparatus 10-1 according to the present embodiment.

First, the communication apparatus 10-1 determines whether a reception time of the frame to be transmitted is known to the reception side (step S102). Specifically, the control unit 15 determines whether or not an immediate response to the frame to be transmitted is requested from another communication apparatus 10-1. For example, the control unit 15 determines whether or not an immediate response request is previously received from the destination of the frame to be transmitted or whether or not an immediate response request is included in a frame serving as a response to the original frame from the transmission destination.

When the immediate response is requested, the control unit 15 causes the communication unit 12 to transmit the frame when a predetermined time known to the communication apparatus 10-1 elapses after the frame is received from the transmission destination. For example, the predetermined time is an inter frame space (IFS) such as a short inter frame space (SIFS). Therefore, the communication apparatus 10-1 which is the destination of the frame to be transmitted can detect the reception time of the VSP frame more accurately and reduce a possibility of the reception of the VSP frame failing.

Further, in a process of this step, the control unit 15 may determine whether or not transmission of the frame to be transmitted is permitted when a predetermined time elapses after reception of a frame received later than other frames. In this case, it can be estimated that the reception time of the frame to be transmitted is known to the destination even if the transmission source of the frame received immediately before its own apparatus transmits the frame differs from the destination of the frame to be transmitted.

When the reception time of the frame to be transmitted is determined to be known to the reception side, the communication apparatus 10-1 determines whether or not a predetermined time $T_{VSP}$ elapses after the training signal is transmitted to the destination of the frame to be transmitted (Step S104). Specifically, in the parameter decision process, the control unit 15 determines whether or not the time $T_{VSP}$ decided as the time in which the communication synchronization error falls within a predetermined range elapses.

When the predetermined time $T_{VSP}$ is determined not to elapse after the training signal is transmitted to the destination of the frame to be transmitted, the communication apparatus 10-1 determines whether or not there is a non-transmitted training signal (step S106). Specifically, the control unit 15 determines whether or not the mixed mode frame or the VSP1 frame has been transmitted to the destination of the frame to be transmitted in the previous frame transmission.

When it is determined that there is no non-transmitted training signal, the communication apparatus 10-1 adds the PLCP (VSP2) not including the training signal or the PLCP (VSP3) including only the Service to the frame to be transmitted (step S108). Specifically, the control unit 15 selects VSP2 when it is determined that the mixed mode frame or the VSP1 frame has been transmitted to the destination of the frame to be transmitted in the previous frame transmission. Then, the data processing unit 11 generates a frame to which the VSP2 is added.

Further, when the condition for selecting the VSP2 is satisfied, and the information related to the data part of the frame to be transmitted is uniquely decided, the control unit 15 may select the VSP3. For example, when the information related to the data part of the frame to be transmitted is shared between its own apparatus and the destination of the frame to be transmitted in advance, the control unit 15 selects the VSP3. In this case, the data processing unit 11 generates a frame to which the VSP3 is added.

When it is determined that there is a non-transmitted training signal, the communication apparatus 10-1 adds the PLCP (VSP1) including the non-transmitted training signal to the frame to be transmitted (step S110). More specifically, the control unit 15 selects VSP1 when it is determined that the legacy mode frame has been transmitted to the destination of the frame to be transmitted in the previous frame transmission. Then, the data processing unit 11 generates a frame to which the VSP1 is added.

When it is determined in step S102 that the reception time of the frame to be transmitted is not known to the reception side or when it is determined in step S104 that the predetermined time $T_{VSP}$ elapses after the training signal is transmitted to the destination of the frame to be transmitted, the communication apparatus 10-1 adds the PLCP of the related art to the frame to be transmitted (step S112).

Specifically, the control unit 15 selects the legacy mode or the mixed mode, and the data processing unit 11 generates the mixed mode frame.

(Reception Method Selection Process)

Next, a reception method selection process will be described with reference to FIG. 8. FIG. 8 is a flowchart conceptually illustrating the reception method selection process of the communication apparatus 10-1 according to the present embodiment.

First, the communication apparatus 10-1 determines whether or not the predetermined time $T_{VSP}$ elapses after the frame is received from the VSP-supporting apparatus (step S202). Specifically, the control unit 15 determines whether or not $T_{VSP}$ elapses after the frame is received from the communication apparatus 10-1 related to communication in which the VSP setting is not disabled.

When the predetermined time $T_{VSP}$ is determined to elapse after the frame is received from the VSP supporting apparatus, the communication apparatus 10-1 is on standby only for the frame including the PLCP of the related art (step S204). Specifically, when $T_{VSP}$ is determined to elapse after the frame is received from the communication apparatus 10-1 related to the communication in which the VSP setting is not disabled, the control unit 15 causes a state of the communication unit 12 to transition to a state in which only the process of receiving the frame including the PLCP of the related art is performed. Further, when the VSP frame is received in the state in which only the process of receiving the frame including the PLCP of the related art is performed, the communication unit 12 does not perform the process of receiving the VSP frame because the frame format is different.

When the predetermined time $T_{VSP}$ is determined not to elapse after the frame is received from the VSP supporting apparatus, the communication apparatus 10-1 is on standby for both the frame including the PLCP of the related art and the frame including the VSP (step S206). Specifically, when $T_{VSP}$ is determined not to elapse after the frame is received from the communication apparatus 10-1 related to the communication in which the VSP setting is not disabled, the control unit 15 causes the state of the communication unit 12 to transition to the state in which the process of receiving the frame including the VSP is performed. In the process of receiving the VSP frame, information obtained from the received training signal, for example, a channel estimation value (including a gain set value) is used.

(Specific Example of Communication)

Next, a specific example of communication performed according to the process of FIGS. 7 and 8 will be described with reference to FIG. 9. FIG. 9 is a diagram illustrating an example of a frame exchange sequence performed in the communication system according to the present embodiment.

First, a master unit 10-1#0 transmits the legacy mode transmission permission request frame to slave units 10-1#1 and 10-1#2. Then, the slave unit 10-1#1 that has received the frame transmits the legacy mode transmission permission frame to the master unit 10-1#0. The mixed mode may be selected instead of the legacy mode.

Then, the master unit 10-1#0 that has received the transmission permission frame transmits the data frame which is the VSP1 frame to the slave unit 10-1#1. Then, the slave unit 10-1#1 that has received the frame transmits an ACK frame which is the VSP1 frame to the master unit 10-1#0.

Then, the master unit 10-1#0 transmits the mixed mode frame to the slave unit 10-1#2. Then, the slave unit 10-1#2 that has received the frame transmits a mixed mode ACK frame to the master unit 10-1#0. Instead of the mixed mode frame, the legacy mode frame may be transmitted, but in this example, the mixed mode frame is described as being transmitted.

Then, the master unit 10-1#0 transmits the data frame which is the VSP2 frame to the slave unit 10-1#1. Then, the slave unit 10-1#1 that has received the frame transmits an ACK frame which is the VSP2 frame to the master unit 10-1#0. Here, the original frame and the VSP frame transmitted and received between the master unit 10-1#0 and the slave unit 10-1#1 are also received by other communication apparatuses 10-1. Therefore, the slave unit 10-1#1 receives the ACK frame transmitted from the slave unit 10-1#2 to the master unit 10-1#0 and can detect the reception time of the data frame destined for the slave unit 10-1#1 which is transmitted from the master unit 10-1#0.

Then, the master unit 10-1#0 transmits the data frame which is the VSP2 frame to the slave unit 10-1#2. Then, the slave unit 10-1#2 that has received the frame transmits an ACK frame which is the VSP2 frame to the master unit 10-1#0.

As described above, according to the first embodiment of the present disclosure, the communication apparatus 10-1 selects any one of the frame of the first format including the training signal and the frame of the second format including no first field which is at least a part of the training signal, generates the frame of the selected format, and transmits the frame of the first format or the frame of the second format. Further, the communication apparatus 10-1 receives the frame of the first format including the training signal or the frame of the second format including no first field which is at least a part of the training signal. For this reason, it is possible to reduce the overhead of communication while suppressing influence on the frame reception process since the already transmitted training signal is not included in the PLCP.

Further, at least a part of the training signals includes the training signal for backward compatibility. For this reason, for example, when the mixed mode frame including the training signal for backward compatibility is used and the legacy mode frame is already transmitted, the PLCP is shortened, and the overhead of communication can be reduced.

Further, the frame of the second format is configured with the signal including information related to the data part of the frame and the data part and does not include the training signal. Therefore, since the training signal is not included, the PLCP can be further shortened, and the overhead of communication can be further reduced.

Further, the frame of the second format is configured with only the data part of the frame and does not include the signal including the information related to the data part and the training signal. Therefore, the PLCP is further shortened, and thus it is possible to further reduce the overhead of communication.

Further, the communication apparatus 10-1 selects the frame of the second format when the first condition related to the transmission time of the frame to be transmitted is satisfied. Therefore, when the above condition is set so that the reception success rate of the VSP frame is improved, it is possible to suppress the reception failure of the VSP frame and improve the use efficiency of the wireless communication resources.

Further, the first condition includes that the transmission time of the frame to be transmitted be before a predetermined time elapses after the frame of the first format is transmitted to the destination of the frame to be transmitted.

For this reason, when the communication state changes over time and the use of the received training signal is undesirable, the VSP frame is not transmitted, and thus the decrease in the reception success rate of the VSP frame can be suppressed.

Further, it is included that the predetermined time be a time in which the communication synchronization error falls within a predetermined range. Therefore, when the VSP frame is transmitted within the time in which the communication success rate is maintained, it is possible to further suppress the decrease in the reception success rate of the VSP frame.

Further, it is included that the predetermined time be a time shorter than the other time among times decided by the transmission destination of the frame of the first format and its own apparatus. For this reason, when the transmission condition of the VSP frame is set so that the communication synchronization error falls within an allowable range in both of the communication apparatuses, it is possible to further suppress the decrease in the reception success rate of the VSP frame.

Further, the first condition includes a condition that the transmission time of the frame to be transmitted be known to the destination of the frame to be transmitted. Therefore, the communication apparatus 10-1 that receives the VSP frame can be on standby in the state in which the process of receiving the VSP frame is possible, and it is possible to suppress the occurrence of the reception failure of the VSP frame.

Further, the first condition includes that the frame of the first format and the frame of the second format also be received by other communication apparatuses other than the transmission destination of the frame of the first format. For this reason, the communication apparatus 10-1 in the non-communication state can detect a timing at which the frame is transmitted to the communication apparatus 10-1 without separately performing the communication of notifying of the transmission timing, and it is possible to improve the efficiency of communication while suppressing the occurrence of the reception failure of the VSP frame.

Further, "being known" mentioned above includes that the transmission of the frame to be transmitted be permitted when a predetermined time elapses after reception of a frame received later than other frames. Therefore, the communication apparatus 10-1 serving as the destination of the frame to be transmitted can detect the reception time of the VSP frame more accurately and reduce the possibility of the reception failure of the VSP frame.

Further, "being known" mentioned above includes that the frame received from another communication apparatus indicate the immediate response request. Therefore, since the transmission time of the frame to be exchanged is more accurately detected, it is possible to further suppress the occurrence of the reception failure of the VSP frame.

Further, when a predetermined time elapses after the frame is received, the communication apparatus 10-1 receives only the frame of the first format. Therefore, in the state in which it is not desirable to use the received training signal, the process of receiving the VSP frame is not performed, and thus a load related to the reception process is reduced, and the power consumption of the communication apparatus 10-1 can be suppressed. The communication apparatus 10-1 may be consistently on standby for both the original frame and the VSP frame. In this case, since switching of the standby process is not performed, the process can be simplified.

2-3. Modified Examples

The first embodiment of the present disclosure has been described above. Note that this embodiment is not limited to the above examples. Modified examples of the first and second embodiments will now be described.

First Modified Example

Figure 10:
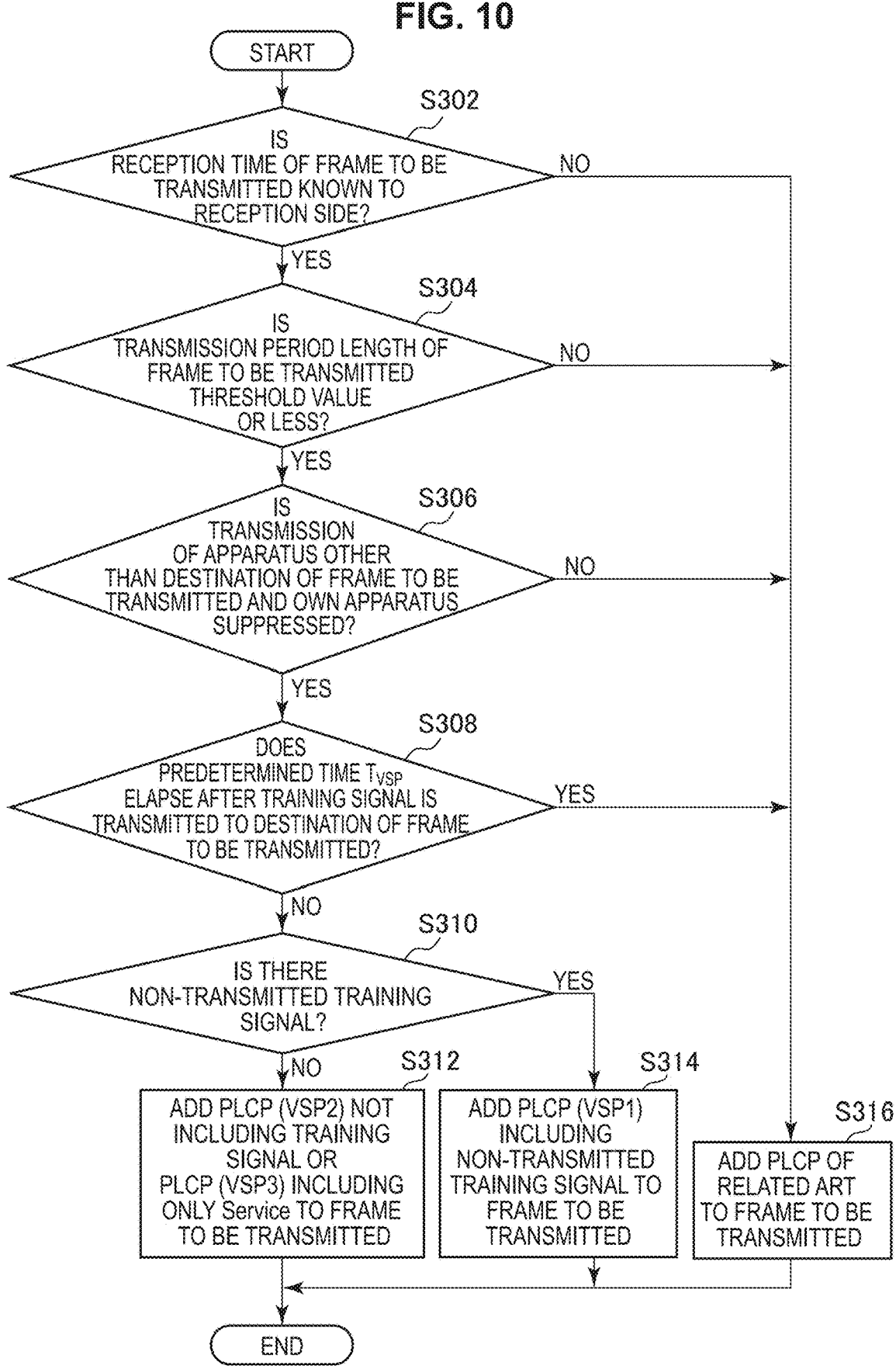
FIG. 10 is a flowchart conceptually illustrating a PLCP selection process of a communication apparatus according to a first modified example of the present embodiment.

As a first modified example of the present embodiment, the VSP frame may be transmitted when the first condition related to the transmission time of the frame is satisfied and the communication apparatus 10-1 other than the destination of the frame to be transmitted or its own apparatus is in the state in which the frame is not transmitted. Further, the VSP frame may be transmitted when the first condition related to the transmission time of the frame is satisfied and the transmission period length of the frame to be transmitted is a threshold value or less. A process of the communication apparatus 10-1 according to the present modified example will be described with reference to FIG. 10. FIG. 10 is a flowchart conceptually illustrating the PLCP selection process of the communication apparatus 10-1 according to the first modified example of the present embodiment. Further, description of processes that are substantially the same as the processes according to the first embodiment is omitted.

First, the communication apparatus 10-1 determines whether or not the reception time of the frame to be transmitted is known to the reception side (step S302).

When the reception time of the frame to be transmitted is determined to be known to the reception side, the communication apparatus 10-1 determines whether or not the transmission period length of the frame to be transmitted is a threshold value or less (step S304). Specifically, the control unit 15 determines whether or not the transmission period length other than the PLCP part of the frame to be transmitted, that is, the transmission period length other than the PLCP preamble and the PLCP header, is a threshold value or less. Further, the control unit 15 may perform the determination using a data length, for example, a byte length instead of the transmission period length.

When the transmission period length of the frame to be transmitted is determined to be a threshold value or less, the communication apparatus 10-1 determines that it is a transmission suppression period indicated by a signal for suppressing the frame transmission of the communication apparatus 10-1 other than the destination of the frame to be transmitted and its own apparatus (step S306). Specifically, the control unit 15 determines whether or not the transmission permission request frame and the transmission permission frame to the transmission permission request frame are exchanged before the transmission of the frame to be transmitted. For example, the control unit 15 transmits the RTS frame, and determines whether or not the CTS frame indicating that transmission to its own apparatus is permitted is received as the response to the RTS frame. In this case, since a network allocation vector (NAV) is set in communication apparatuses 10-1 that receive the CTS frame other than its own apparatus, the frame transmission of other communication apparatuses 10-1 is suppressed in a period in which the NAV is valid. Further, the NAV setting according to the embodiment of the present disclosure may be performed by an exchange of a frame other than the RTS frame and the CTS frame. For example, the NAV may be set by a DATA frame (including a Quality of Service (QoS) DATA frame as well) and an ACK (including a block ack frame as well) instead of the RTS frame or the CTS frame.

When the frame transmission of the communication apparatus 10-1 other than the destination of the frame to be transmitted and its own apparatus is determined to be suppressed, the communication apparatus 10-1 determines whether or not a predetermined time $T_{VSP}$ elapses after the training signal is transmitted to the destination of the frame to be transmitted (step S308), and performs the process of adding the PLCP in accordance with a determination result (steps S312 and S314).

When it is determined in step S304 that the transmission period length of the frame to be transmitted is greater than the threshold value or when it is determined in step S306 that the frame transmission of the communication apparatus 10-1 other than the destination of the frame to be transmitted and its own apparatus is not suppressed, the communication apparatus 10-1 adds the PLCP of the related art to the frame to be transmitted (step S316).

As described above, according to the first modified example of the present embodiment, the first condition includes that it be the transmission suppression period indicated by the signal which is exchanged between the destination of the frame to be transmitted and its own apparatus and used for suppressing the frame transmission of communication apparatuses other than the destination of the frame to be transmitted and its own apparatus. Here, when the frame transmission from other communication apparatuses 10-1 is permitted, a mismatch occurs between the type of frame transmitted from the master unit and the type of frame for which the slave unit is on standby, and the possibility of the reception failure of the VSP frame increases. Therefore, when the frame transmission of other communication apparatuses 10-1 is suppressed, it is possible to suppress the decrease in the reception success rate of the VSP frame.

Further, in the communication apparatus 10-1, the first condition includes that the transmission period length of the frame to be transmitted be a threshold value or less. Here, as the transmission period length of the frame to be transmitted increases, that is, as the amount of data to be transmitted increases, the risk of frame reception failure, for example, influence of the increase in consumption of wireless communication resources and the increase in the transmission period which are caused by the occurrence of retransmission, increases. Therefore, when the frame transmission period length exceeds the threshold value, the frame transmission of the VSP frame is not performed, and thus the risk can be prevented.

Second Modified Example

As a second modified example of the present embodiment, the communication apparatus 10-1 may check whether or not the transmission time of the frame to be transmitted is known to communication apparatuses 10-1 other than the communication apparatus 10-1 in the communication state. Specifically, the control unit 15 causes the communication unit 12 to transmit the transmission permission request to other communication apparatuses 10-1, and when the transmission permission is received in response to the transmission permission request from other communication apparatuses 10-1, the transmission time of the frame to be transmitted is determined to be known to the other communication apparatus 10-1.

For example, the control unit 15 causes the communication unit 12 to transmit the RTS frame to other communication apparatuses 10-1 before the PLCP selection process is performed. When the CTS frame is received as the response to the RTS frame, the control unit 15 determines that the transmission time of the frame to be transmitted is known to the transmission destination of the CTS frame.

As described above, according to the second modified example of the present embodiment, the communication apparatus 10-1 transmits the transmission permission request to other communication apparatuses, and the first condition includes that the transmission permission be received from other communication apparatuses in response to the transmission permission request. Therefore, it is possible to suppress the situation in which the VSP frame is transmitted to other communication apparatuses 10-1, and the reception of the VSP frame fails in the state in which other communication apparatuses 10-1 are unable to detect the transmission timing of the VSP frame and are not on standby for the VSP frame.

3. SECOND EMBODIMENT (EXAMPLE IN WHICH REQUESTED PLCP IS SELECTED)

The communication apparatus 10-1 according to the first embodiment of the present disclosure has been described above. Next, a communication apparatus 10-2 according to the second embodiment of the present disclosure will be described. The communication apparatus 10-2 according to the present embodiment selects the PLCP to be added to the frame to be transmitted on the basis of a request from a communication partner.

<3-1. Configuration of Communication Apparatus>

The communication apparatus 10-2 has substantially the same functional configuration as that of the first embodiment, except for a portion of the functions of the data processing unit 11, the communication unit 12, and the control unit 15. Note that substantially the same functions as those of the first embodiment will not be described.

(PLCP Designation Function)

The control unit 15 designates the PLCP to be added to the frame transmitted from the communication destination to its own apparatus. Specifically, the control unit 15 makes a decision regarding a VSP frame use request on the basis of a certain condition related to the transmission time of the frame serving as a second condition.

For example, the control unit 15 makes a decision for requesting the transmission of the VSP frame when the transmission time of the frame including information related to the use request is before a predetermined time elapses after the original frame is received, and the transmission time of the frame to be received as the response to the frame including the information related to the use request is known to its own apparatus. Further, the control unit 15 decides the type of VSP frame, that is, VSP1, VSP2, or VSP3, when the decision related to the presence or absence of the VSP frame use request is made.

Figure 11:
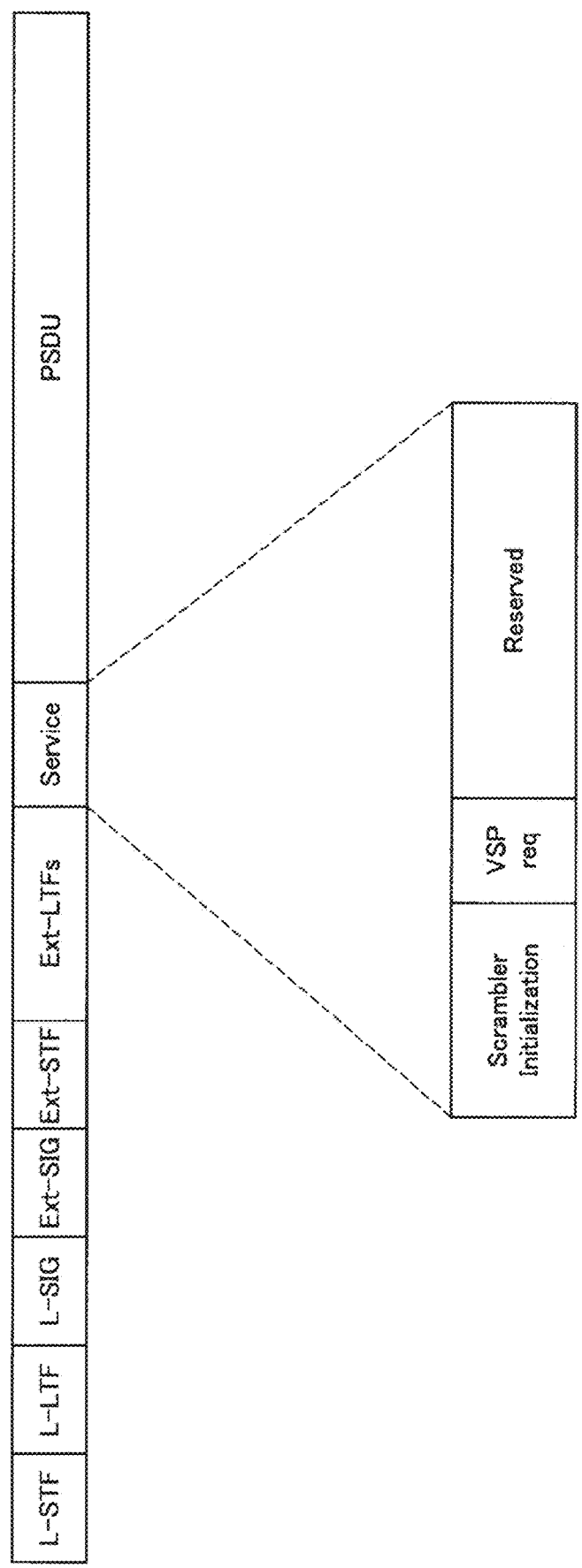
FIG. 11 is a diagram illustrating an example of a frame including a VSP frame use request according to a second embodiment of the present disclosure.

The data processing unit 11 generates a frame including a VSP frame use request. Specifically, the data processing unit 11 generates a frame including information indicating the presence or absence of the VSP frame use request and the type of VSP frame decided by the control unit 15. The frame including the VSP frame use request will be described with reference to FIG. 11. FIG. 11 is a diagram illustrating an example of the frame including the VSP frame use request according to the present embodiment.

The data processing unit 11 generates a frame including information indicating the presence or absence of the use request and the type. For example, the information related to the use request includes a flag indicating the presence or absence of the use request and the type (hereinafter, also referred to as a "use request flag"), for example, VSP req illustrated in FIG. 11, and may be stored in a Service field of the frame. A storage location of the use request flag is not limited thereto, and the use request flag may be stored in any other field, for example, a SIGNAL field, a Reserve field of a MAC header, or any other field dedicated thereto. Further, the use request flag indicates that there is no use request when the value is 0, that the VSP1 frame is requested when the value is 1, that the VSP2 frame is requested when the value is 2, and that the VSP3 frame is requested when the value is 3.

(PLCP Selection Function)

The control unit 15 selects the PLCP on the basis of the information related to the use request included in the received frame. Specifically, the control unit 15 selects the VSP when the transmission time of the frame to be transmitted is known to the destination of the frame to be transmitted, and the transmission of the VSP frame is requested through the information related to the received use request. VSP1, VSP2 or VSP3 is selected on the basis of the type of VSP indicated by the information related to the use request.

(Reception Method Selection Function)

The communication unit 12 selects the process of receiving the frame to be transmitted on the basis of the use request to respond to the use request decided by the control unit 15. Specifically, the communication unit 12 is on standby for a frame of a type indicated by the information related to the use request included in the transmitted frame. For example, the communication unit 12 is on standby for the original frame when the value of the use request flag is 0, on standby for the VSP1 frame when the value is 1, on standby for the VSP2 frame when the value is 2, and on standby for the VSP3 frame when the value is 3.

<3-2. Process of Communication Apparatus>

Figure 12:
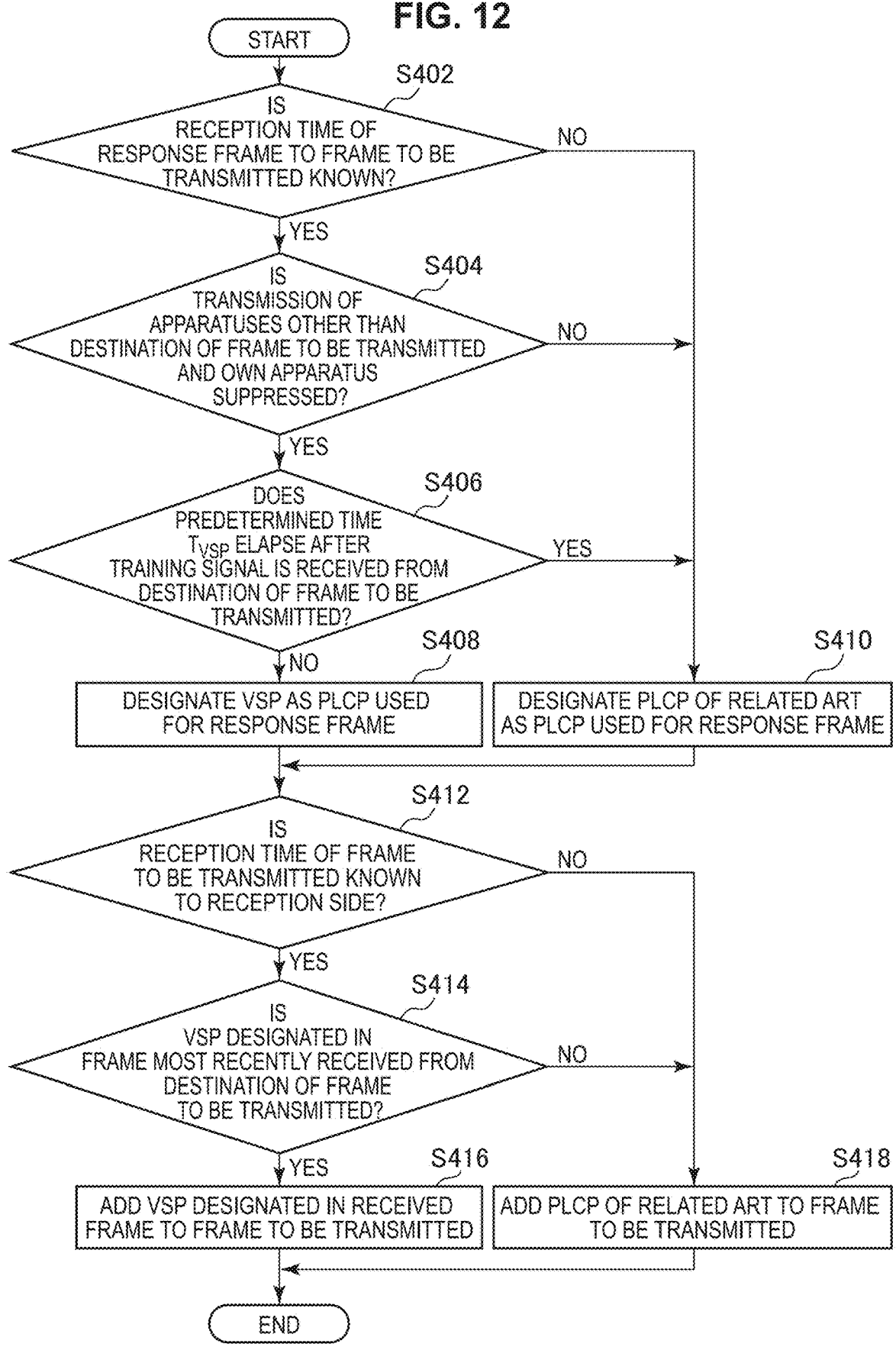
FIG. 12 is a flowchart conceptually illustrating a PLCP designation process and a PLCP selection process of a communication apparatus according to the present embodiment.
Figure 13:
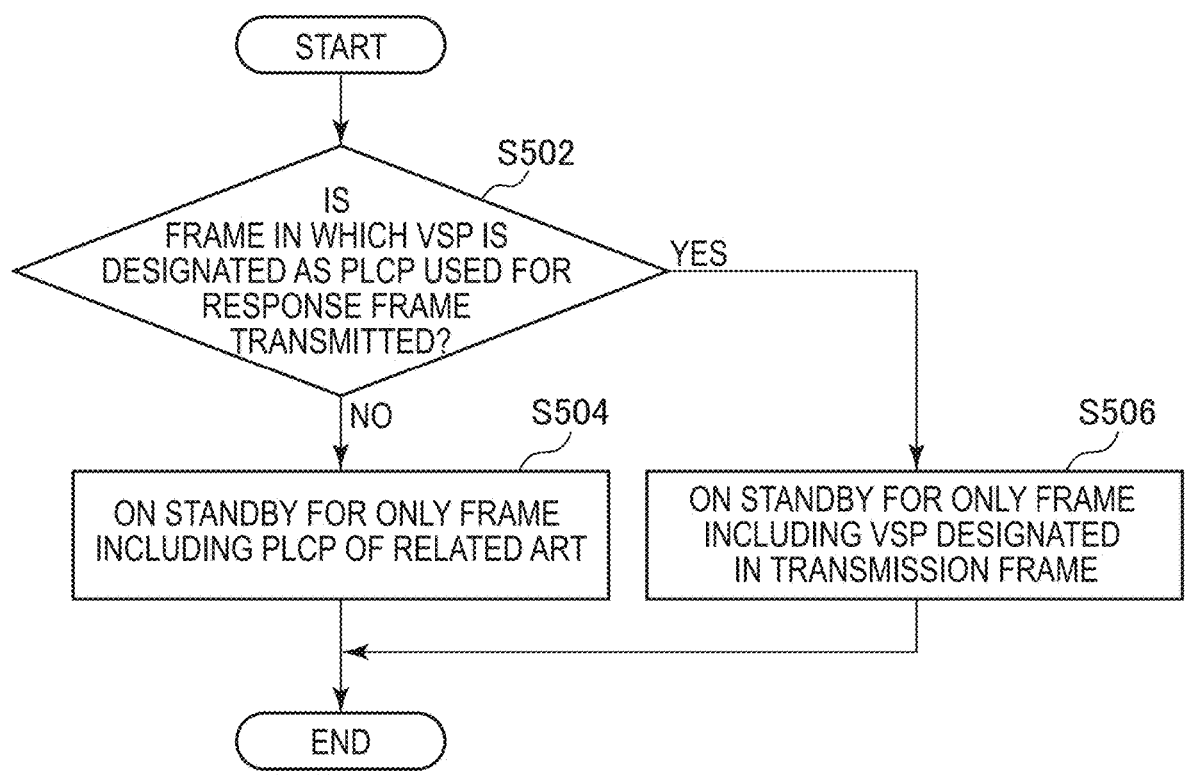
FIG. 13 is a flowchart conceptually illustrating a reception method selection process of a communication apparatus according to the present embodiment.
Figure 14:
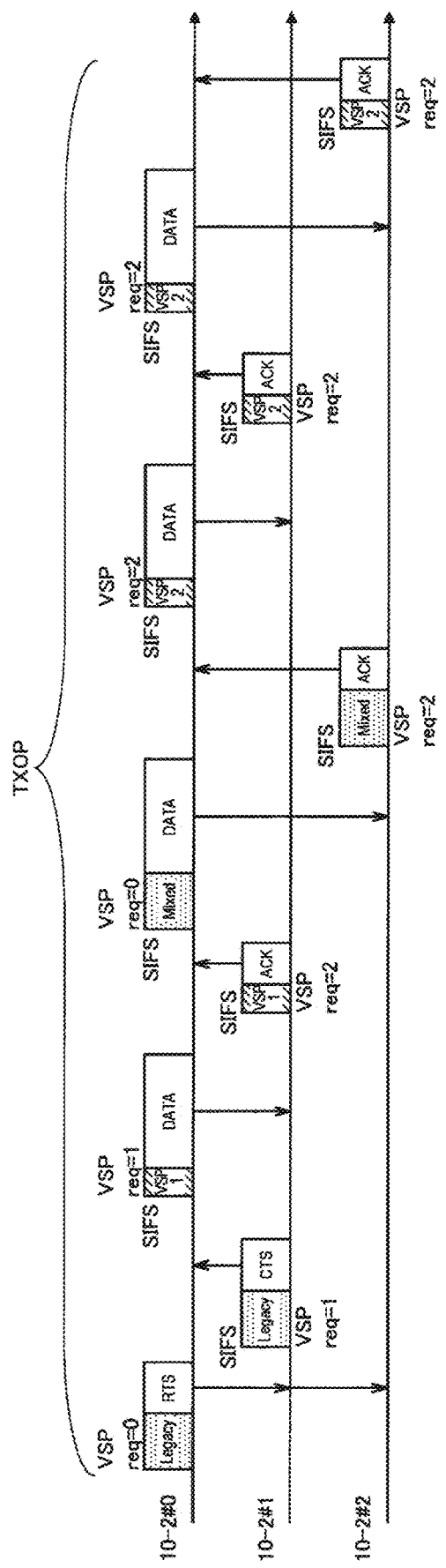
FIG. 14 is a diagram illustrating a frame exchange sequence for describing an example of a process of a communication system according to the present embodiment.

Next, a process of the communication apparatus 10-2 according to the present embodiment will be described with reference to FIGS. 12 to 14.

First, a PLCP designation process and a PLCP selection process will be described with reference to FIG. 12. FIG. 12 is a flowchart conceptually illustrating the PLCP designation process and the PLCP selection process of the communication apparatus 10-2 according to the present embodiment. Further, description of processes that are substantially the same as the processes of the first embodiment will be omitted.

(PLCP Designation Process)

First, the communication apparatus 10-2 determines whether or not the reception time of the response frame to the frame to be transmitted is known (step S402). Specifically, the control unit 15 determines whether or not the immediate response request is transmitted to the transmission destination of the frame to be transmitted. When the immediate response is a fixed setting common to the communication apparatuses 10-2, the process of this step may be omitted.

When the reception time of the response frame to the frame to be transmitted is determined to be known, the communication apparatus 10-2 determines whether or not the transmission of apparatuses other than the destination of the frame to be transmitted and its own apparatus is suppressed (step S404).

When the transmission of apparatuses other than the destination of the frame to be transmitted and its own apparatus is determined to be suppressed, the communication apparatus 10-2 determines whether or not a predetermined time $T_{VSP}$ elapses after the training signal is received from the destination of the frame to be transmitted (Step S406).

When a predetermined time $T_{VSP}$ is determined not to elapse after the training signal is received from the destination of the frame to be transmitted, the communication apparatus 10-2 designates the VSP as the PLCP used for the response frame (step S408). Specifically, the control unit 15 determines the presence or absence of a non-transmitted training signal, selects VSP1 when there is a non-transmitted training signal, and designates "1" as the value of the use request flag. If there is no non-transmitted training signal, the control unit 15 selects VSP2 and designates "2" as the value of the use request flag.

When the condition for selecting VSP2 is satisfied and the information related to the data part of the frame to be transmitted is uniquely decided, the control unit 15 may select VSP3 and set "3" as the value of the use request flag.

When a predetermined time $T_{VSP}$ is determined to elapse after the training signal is received from the destination of the frame to be transmitted, the communication apparatus 10-2 designates the PLCP of the related art as the PLCP used for the response frame (step S410). Specifically, the control unit 15 selects the PLCP of the related art and designates "0" as the value of the use request flag.

(PLCP Selection Process)

Then, the communication apparatus 10-2 determines whether or not the reception time of the frame to be transmitted is known to the reception side (step S412).

When the reception time of the frame to be transmitted is determined to be known to the reception side, the communication apparatus 10-2 determines whether or not the VSP is designated in the frame most recently received from the destination of the frame to be transmitted (step S414). Specifically, the control unit 15 acquires the use request flag of the frame which is received later than any of other received frames before the process of this step, and determines whether or not the value of the use request flag is 0.

When the VSP is determined to be designated in the frame most recently received from the destination of the frame to be transmitted, the communication apparatus 10-2 adds the VSP designated in the received frame to the frame (step S416). Specifically, when the value of the use request flag is determined not to be 0, the control unit 15 selects the VSP corresponding to the value designated by the use request flag. For example, the control unit 15 selects VSP1 when the value of the use request flag is 1, selects VSP2 when the value is 2, and selects VSP3 when the value is 3. Then, the data processing unit 11 adds the VSP selected by the control unit 15 to the frame to be transmitted.

When the VSP is determined not to be designated in the frame most recently received from the destination of the frame to be transmitted, the communication apparatus 10-2 adds the PLCP of the related art to the frame to be transmitted (step S418). Specifically, when the value of the use request flag is determined to be 0, the control unit 15 selects the PLCP of the related art. For example, when the value of the use request flag is 0, the control unit 15 selects the PLCP of the legacy mode or the mixed mode. Then, the data processing unit 11 adds the PLCP selected by the control unit 15 to the frame to be transmitted.

(Reception Method Selection Process)

Next, the reception method selection process will be described with reference to FIG. 13. FIG. 13 is a flowchart conceptually illustrating the reception method selection process of the communication apparatus 10-2 according to the present embodiment.

First, the communication apparatus 10-2 determines whether or not the frame in which the VSP is designated as the PLCP used for the response frame is transmitted (step S502). Specifically, the control unit 15 determines whether or not the value of the use request flag included in the transmitted frame is designated to be 0.

When the frame in which the VSP is designated as the PLCP used for the response frame is determined not to be transmitted, the communication apparatus 10-2 is on standby for only the frame including the PLCP of the related art (step S504). Specifically, when it is determined that the value of the use request flag is designated to be 0, the control unit 15 causes the state of the communication unit 12 to transition to the state in which the process of receiving the frame including the PLCP of the related art is performed.

When the frame in which the VSP is designated as the PLCP used for the response frame is determined to be transmitted, the communication apparatus 10-2 is on standby for only the frame including the VSP designated in the transmission frame (step S506). Specifically, when it is determined that the value of the use request flag is set to 1, the control unit 15 causes the state of the communication unit 12 to transition to the state in which the process of receiving the frame including the VSP1 is performed. Further, when it is determined that the value of the use request flag is set to 2, the control unit 15 causes the state of the communication unit 12 to transition to the state in which the process of receiving the frame including the VSP2 is performed. Further, when it is determined that the value of the use request flag is set to 3, the control unit 15 causes the state of the communication unit 12 to transition to the state in which the process of receiving the frame including the VSP3 is performed. In the process of receiving the VSP frame, the information obtained from the received training signal, for example, the channel estimation value (including the gain set value) or the like, is used.

(Specific Example of Communication)

Next, a specific example of communication performed according to the process of FIG. 12 and FIG. 13 will be described with reference to FIG. 14. FIG. 14 is a diagram illustrating an example of a frame exchange sequence performed in the communication system according to the present embodiment. Further, description of processes that are substantially the same as the processes of the first embodiment will be omitted.

First, a master unit 10-2#0 transmits the legacy mode transmission permission request frame including the use request flag having the value of 0 to slave units 10-2#1 and 10-2#2. Then, the slave unit 10-2#1 that has received the frame transmits the legacy mode transmission permission frame including the use request flag having the value of 1 to the master unit 10-2#0.

Then, the master unit 10-2#0 that has received the transmission permission frame including the use request flag having the value of 1 transmits the data frame which is the VSP1 frame including the use request flag having the value of 1 to the slave unit 10-2#1. Then, the slave unit 10-2#1 that has received the frame transmits the ACK frame which is the VSP1 frame including the use request flag having the value of 2 to the master unit 10-2#0.

Then, the master unit 10-2#0 transmits the mixed mode frame including the use request flag having the value of 0 to the slave unit 10-2#2. Then, the slave unit 10-2#2 that has received the frame transmits the mixed mode ACK frame including the use request flag having the value of 2 to the master unit 10-2#0.

Then, the master unit 10-2#0 transmits the data frame which is the VSP2 frame including the use request flag having the value of 2 to the slave unit 10-2#1. Then, the slave unit 10-2#1 that has received the frame transmits the ACK frame which is the VSP2 frame including the use request flag having the value of 2 to the master unit 10-2#0.

Then, the master unit 10-2#0 transmits the data frame which is the VSP2 frame including the use request flag having the value of 2 to the slave unit 10-2#2. Then, the slave unit 10-2#2 that has received the frame transmits the ACK frame which is the VSP2 frame including the use request flag having the value of 2 to the master unit 10-2#0.

Thus, according to the second embodiment of the present disclosure, the communication apparatus 10-2 transmits the VSP frame when the frame including the VSP frame use request is received. Therefore, since the PLCP is selected on the basis of the use request of which the reception side notifies, more appropriate PLCP is selected than when the PLCP is selected according to the determination of the transmitting side, and it is possible to suppress the occurrence of the frame reception failure caused by erroneous selection of the PLCP.

Further, the communication apparatus 10-2 receives the frame including the use request for the frame of the second format which is transmitted when a second condition related to the transmission time of the frame is satisfied. Therefore, since the condition for the transmission of the use request is set so that the reception success rate of the VSP frame is improved, it is possible to suppress the reception failure of the VSP frame and improve the use efficiency of the wireless communication resources.

The second condition includes that the transmission time of the frame including the use request be before a predetermined time elapses after the frame of the first format is received from the destination of the frame including the use request, and that the transmission time of the frame received as the response to the frame including the use request be known to the transmission source of the frame including the use request. Therefore, since the use request is transmitted in the situation in which the reception success rate of the VSP frame is higher than in other conditions, it is possible to suppress the occurrence of reception failure of the VSP frame.

Further, one of the frame of the first format and the frame of the second format is selected as a frame to be received, on the basis of the use request included in the transmitted frame, and the frame of the selected format is received. Therefore, since only the frame of the PLCP format requested by its own apparatus is awaited, it is possible to reduce the possibility of the frame reception failure and improve the communication efficiency.

In the above example, the presence or absence of the VSP frame use request is indicated by the flag, but the presence or absence of the use request may be indicated depending on whether or not the information related to the use request is included in the frame.

4. THIRD EMBODIMENT (EXAMPLE IN WHICH PLCP IS SELECTED IN SPACE DIVISION MULTIPLEXING COMMUNICATION)

Figure 15:
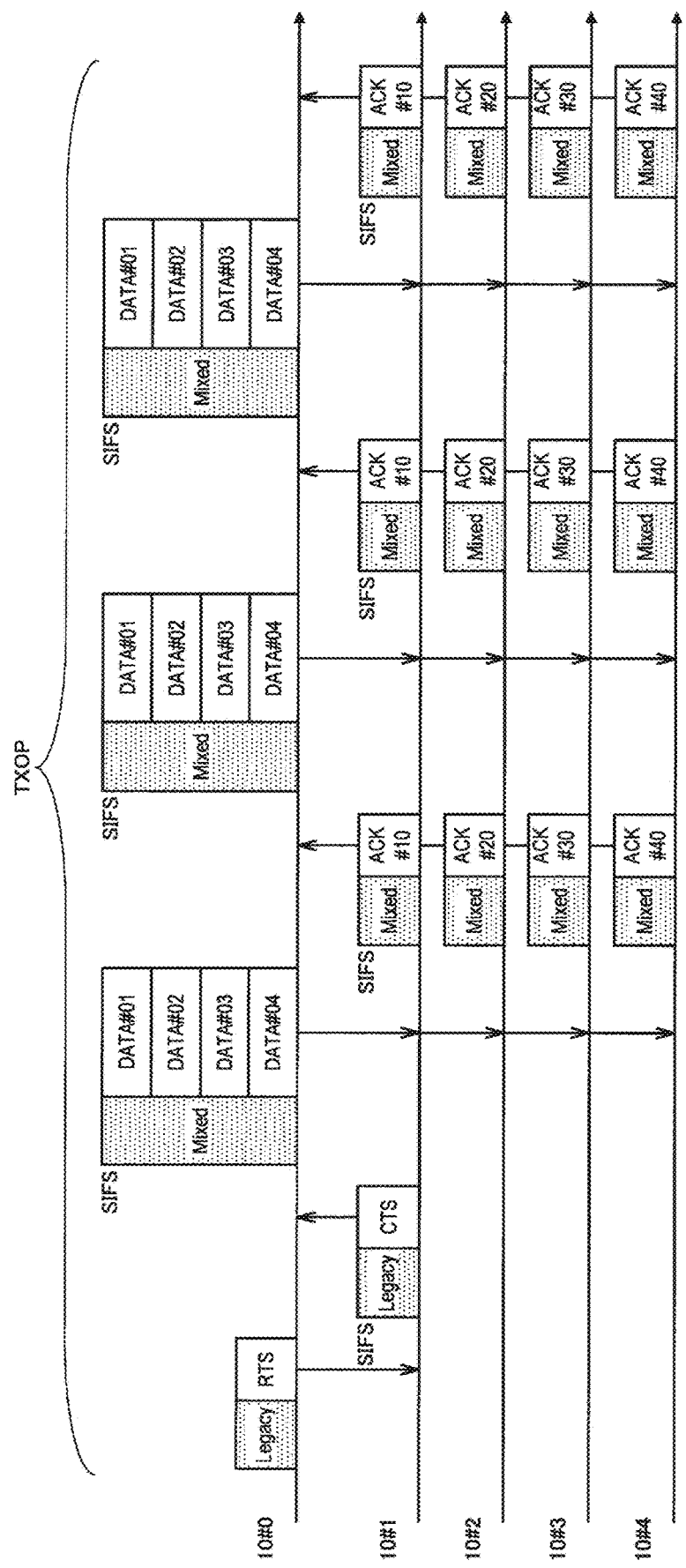
FIG. 15 is a diagram illustrating an example of a frame exchange sequence performed in one-to-many communication according to a related art.

The communication apparatus 10-2 related to the second embodiment of the present disclosure has been described above. Next, a communication apparatus 10-3 according to the third embodiment of the present disclosure will be described. In the first and second embodiments, one-to-one communication between communication apparatuses is an application target, but in the present embodiment, one-to-many communication is an application target. First, one-to-many communication according to a related art will be described with reference to FIG. 15. FIG. 15 is a diagram illustrating an example of a frame exchange sequence performed in one-to-many communication according to a related art.

First, the master unit transmits the legacy mode transmission permission request frame. For example, as illustrated in FIG. 15, the master unit 10#0 transmits the RTS frame to which the PLCP of the legacy mode is added to the slave unit 10#1.

Then, the slave unit that has received the transmission permission request frame transmits the legacy mode transmission permission frame to the master unit. For example, as illustrated in FIG. 15, the slave unit 10#1 transmits the CTS frame to which the PLCP of the legacy mode is added to the master unit 10#0.

Then, the master unit that has received the transmission permission frame generates a plurality of data frames, and transmits the data frames to which the PLCP of the mixed mode common to the generated data frames is added to the slave unit using multiplexing communication. For example, as illustrated in FIG. 15, the master unit 10#0 transmits a plurality of data frames DATA #01 to DATA #04 to which the PLCP of the mixed mode is added to the slave units 10#1 to 10#4 using space division multiplexing communication. Then, the PLCP of the mixed mode is added to the frame to be exchanged later.

As described above, even in the case of one-to-many communication, the PLCP preamble is added to the frame each time communication is performed, and there are cases in which an unnecessary PLCP preamble is transmitted. Furthermore, since a plurality of communication apparatuses transmit the frames, the reduction in efficiency of wireless communication resources may be greater than in the case of one-to-one communication. Therefore, the communication apparatus 10-3 according to the present embodiment is based on the communication apparatus according to the first embodiment, and uses a common VSP as the PLCP of the frames to be multiplexed.

<4-1. Configuration of Communication Apparatus>

Figure 16:
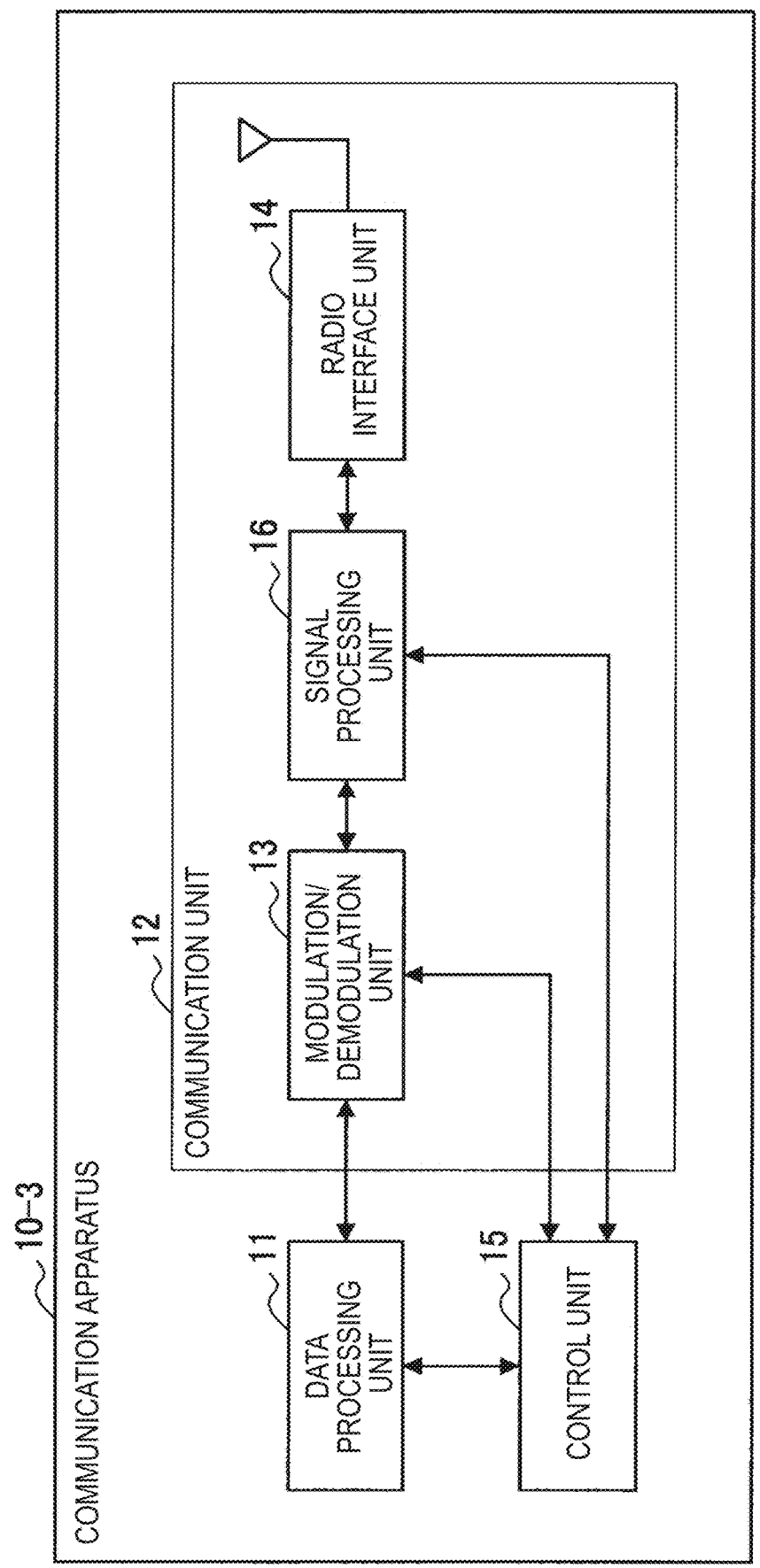
FIG. 16 is a block diagram illustrating a schematic functional configuration of a communication apparatus according to a third embodiment of the present disclosure.

First, a configuration of the communication apparatus 10-3 according to the third embodiment of the present disclosure will be described with reference to FIG. 16. FIG. 16 is a block diagram illustrating a schematic functional configuration of the communication apparatus 10-3 according to the third embodiment of the present disclosure. Further, description of components and functions which are substantially the same as in the first embodiment will be omitted.

As illustrated in FIG. 16, the communication unit 12 includes a signal processing unit 16 in addition to the modulation/demodulation unit 13 and the radio interface unit 14.

The signal processing unit 16 performs a process involved in space-division multiplex communication. Specifically, the signal processing unit 16 performs a signal process involved in space separation, on a symbol stream provided by the modulation/demodulation unit 13, and provides symbol streams obtained by the process to the respective radio interface units 14. The signal processing unit 16 also performs a spatial process, such as a symbol stream separation process or the like, on symbol streams obtained from the radio interface units 14, and provides a symbol stream obtained by the process to the modulation/demodulation unit 13.

The data processing unit 11 generates a plurality of frames and adds a PLCP common to the plurality of frames. Specifically, the data processing unit 11 generates frames destined for a plurality of communication apparatuses 10-3, and adds the PLCP selected by the control unit 15 to the generated frames in common.

<4-2. Process of Communication Apparatus>

Figure 17:
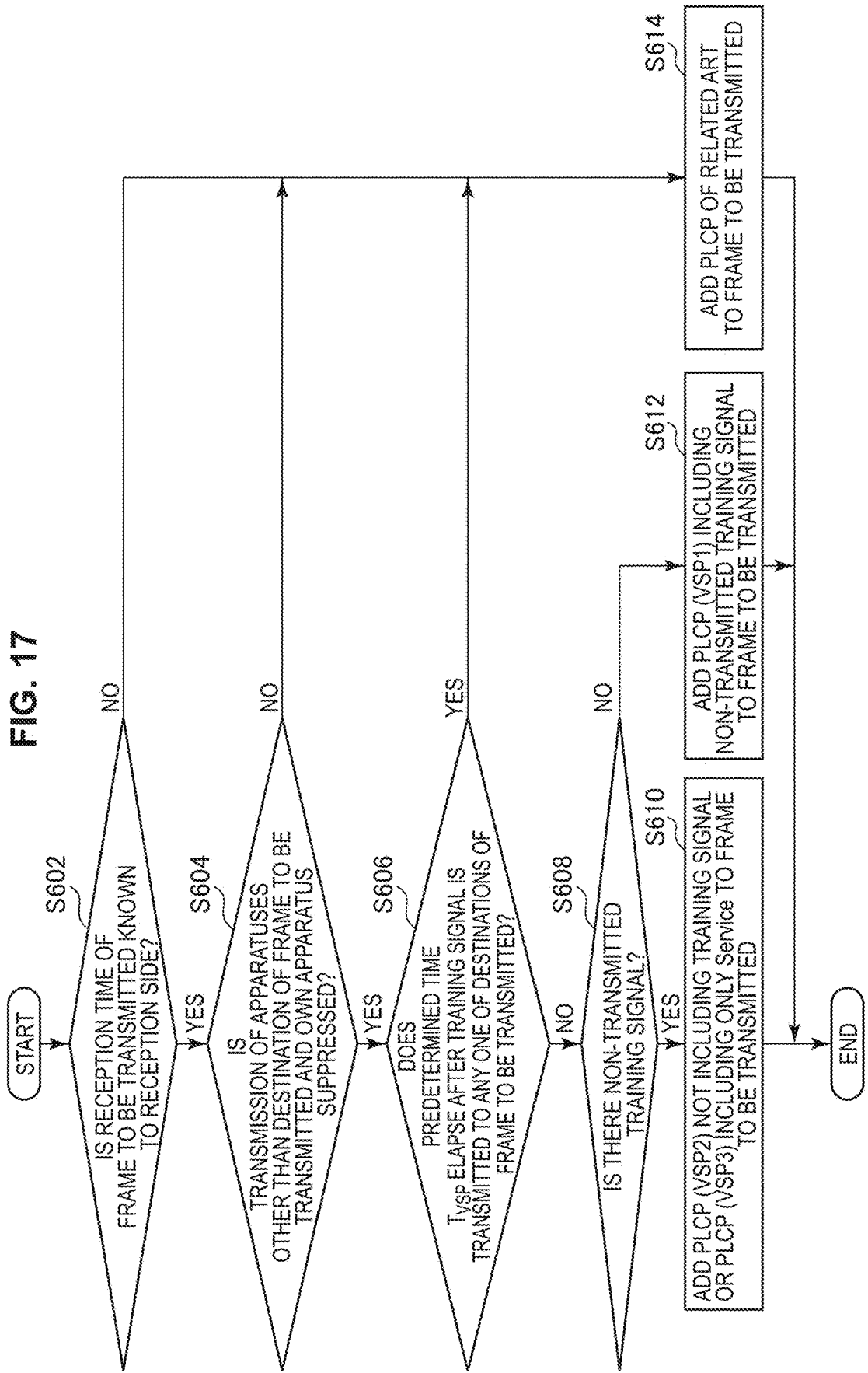
FIG. 17 is a flowchart conceptually illustrating a PLCP selection process of a communication apparatus according to the present embodiment.

Next, a process of the communication apparatus 10-3 according to the present embodiment will be described. The process is substantially the same as the process according to the first embodiment except for the PLCP selection process, and thus only the PLCP selection process will be described with reference to FIG. 17. FIG. 17 is a flowchart conceptually illustrating the PLCP selection process of the communication apparatus 10-3 according to the present embodiment. Further, description of processes that are substantially the same as the processes of the first embodiment will be omitted.

(PLCP Selection Process)

First, the communication apparatus 10-3 determines whether or not the reception time of the frame to be transmitted is known to the reception side (step S602).

When the reception time of the frame to be transmitted is determined to be known to the reception side, the communication apparatus 10-3 determines whether or not the transmission of apparatuses other than the destination of the frame to be transmitted and its own apparatus is suppressed (step S604).

When the transmission of apparatuses other than the destination of the frame to be transmitted and its own apparatus is determined to be suppressed, the communication apparatus 10-3 determines whether or not a predetermined time $T_{VSP}$ elapses after the training signal is transmitted to any one of the destinations of the frame to be transmitted (step S606). Specifically, for each of the communication apparatuses 10-3 that is the destination of the frame to be transmitted, the control unit 15 determines whether or not $T_{VSP}$ elapses after the training signal is transmitted to each of the communication apparatuses 10-3, that is, after the original frame is transmitted. $T_{VSP}$ is decided and managed for each communication link with the communication apparatus 10-3.

When a predetermined time $T_{VSP}$ is determined not to elapse after the training signal is transmitted to all the destinations of the frame to be transmitted, it is determined whether or not there is a non-transmitted training signal (step S608). The control unit 15 does not select VSP unless a predetermined time $T_{VSP}$ is determined not to elapse after the training signal is transmitted to all the destinations of the frames to be transmitted.

If it is determined that there is no non-transmitted training signal, the communication apparatus 10-3 adds the PLCP not including the training signal to the frame to be transmitted (step S610). Specifically, the control unit 15 selects VSP2 when the mixed mode frame or the VSP1 frame is determined to be transmitted to the destination of the frame to be transmitted in the previous frame transmission. Then, the data processing unit 11 adds VSP2 to each of the generated frames destined for a plurality of communication apparatuses 10-3.

If it is determined that there is a non-transmitted training signal, the communication apparatus 10-3 adds the PLCP including the non-transmitted training to the frame to be transmitted (step S612). Specifically, the control unit 15 selects VSP1 when the legacy mode frame is determined to be transmitted to the destination of the frame to be transmitted in the previous frame transmission. Then, the data processing unit 11 adds VSP1 to each of the generated frames destined for a plurality of communication apparatuses 10-3.

When the determination results of step S602 and step S604 are false and the determination result of step S606 is true, the communication apparatus 10-3 adds the PLCP of the related art to the frame to be transmitted (step S614). Specifically, the control unit 15 selects the legacy mode or the mixed mode, and the data processing unit 11 adds the PLCP of the mixed mode to each of the generated frames destined for a plurality of communication apparatuses 10-3.

(Specific Example of Communication)

Figure 18:
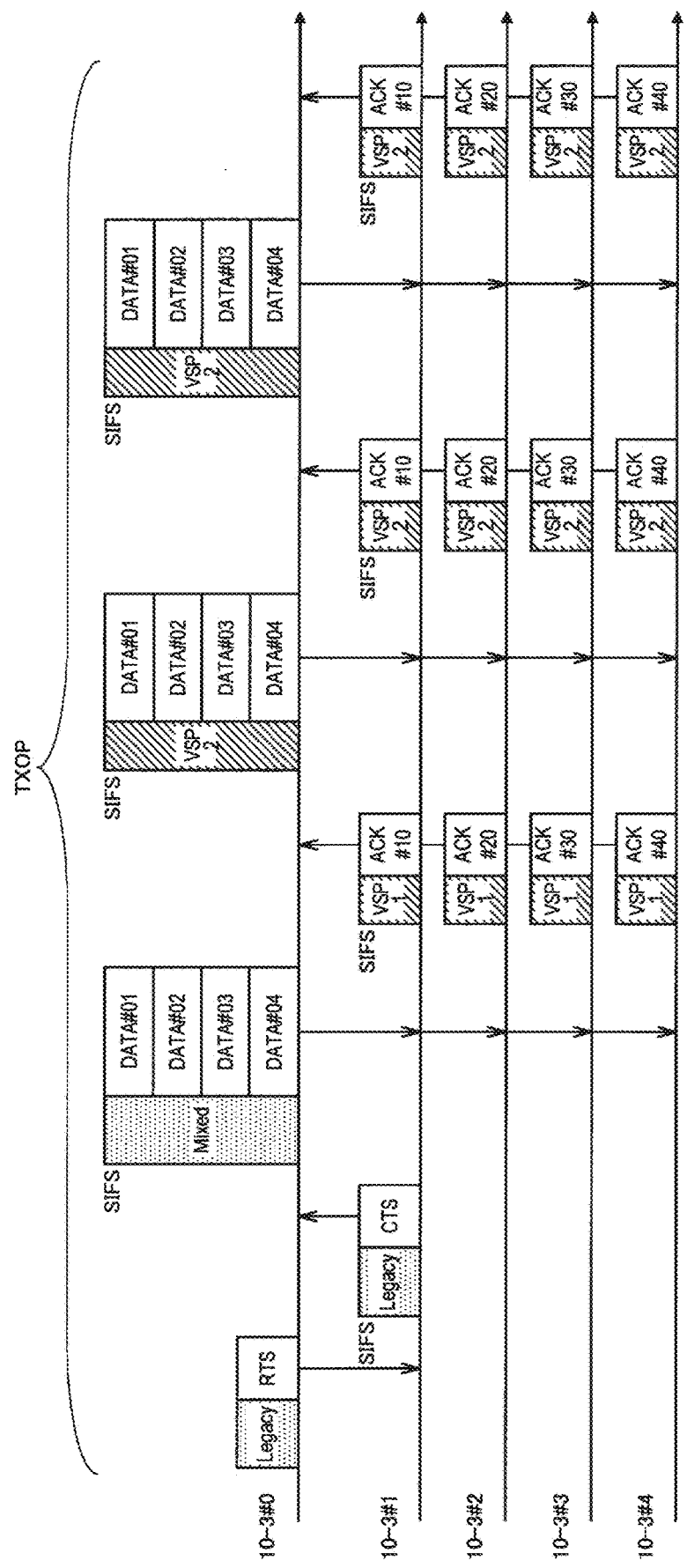
FIG. 18 is a diagram illustrating a frame exchange sequence for describing an example of a process of a communication system according to the present embodiment.

Next, a specific example of communication performed according to the process of FIG. 17 and the like will be described with reference to FIG. 18. FIG. 18 is a diagram illustrating an example of frame exchange sequence performed in the communication system according to the present embodiment. Further, description of processes that are substantially the same as the processing of the first embodiment will be omitted.

First, a master unit 10-3#0 transmits the legacy mode transmission permission request frame to a slave unit 10-3#1. Then, the slave unit 10-3#1 that has received the frame transmits the legacy mode transmission permission frame to the master unit 10-3#0.

Then, the master unit 10-3#0 that has received the transmission permission frame generates the data frame destined for the slave units 10-3#1 to 10-3#4, and transmits the frames to which the PLCP of the mixed mode common to the data frames is added to the slave units 10-3#1 to 10-3#4 using space division multiplexing communication. Each of the slave units 10-3#1 to 10-3#4 that have received the frame transmits the ACK frame that is the VSP1 frame to the master unit 10-3#0. Since the ACK frames are consequently multiplexed, the master unit 10-3#0 receives the ACK frame by performing a process of separating the multiplexed ACK frame.

Then, the master unit 10-3#0 generates the data frames destined for the slave units 10-3#1 to 10-3#4, and transmits the frames to which the VSP2 common to the data frames is added to the slave units 10-3#1 to 10-3#4 using space division multiplexing communication. Each of the slave units 10-3#1 to 10-3#4 that have received the frame transmits the ACK frame to which VSP2 is added to the master unit 10-3#0.

As described above, according to the third embodiment of the present disclosure, the communication apparatus 10-3 generates a plurality of VSP frames and transmits the plurality of VSP frames using space division multiplexing communication. Therefore, since the PLCP preamble is reduced to be smaller than in one-to-many communication, it is possible to reduce the overhead of communication and improve the use efficiency of the wireless communication resources.

<5. FOURTH EMBODIMENT (EXAMPLE IN WHICH PLCP IS SELECTED IN FREQUENCY DIVISION MULTIPLEXING COMMUNICATION)>

Figure 19:
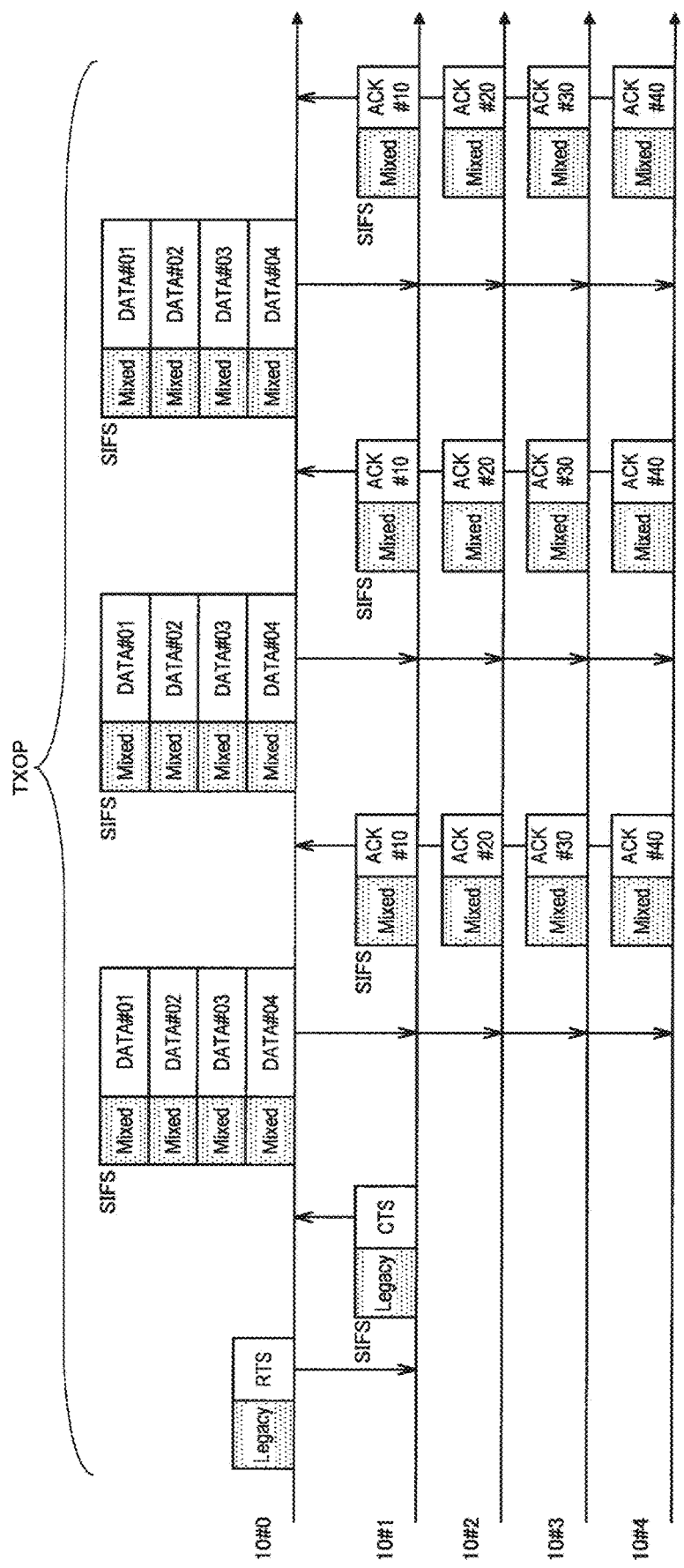
FIG. 19 is a diagram illustrating an example of a frame exchange sequence performed in communication according to a related art when a PLCP is added independently.

The communication apparatus 10-3 according to the third embodiment of the present disclosure has been described above. Next, a communication apparatus 10-4 according to the fourth embodiment of the present disclosure will be described. In the fourth embodiment, the PLCP is added to the frames to be multiplexed in common, but in the present embodiment, the PLCP is independently added to each of the frames to be multiplexed. First, communication according to a related art when the PLCP is added independently will be described with reference to FIG. 19. FIG. 19 is a diagram illustrating an example of a frame exchange sequence performed by communication according to a related art when PLCP is added independently.

First, the master unit transmits the legacy mode transmission permission request frame. For example, as illustrated in FIG. 15, the master unit 10#0 transmits the RTS frame to which the PLCP of the legacy mode is added to the slave unit 10#1.

Then, the slave unit that has received the transmission permission request frame transmits the legacy mode transmission permission frame to the master unit. For example, as illustrated in FIG. 15, the slave unit 10#1 transmits the CTS frame to which the PLCP of legacy mode is added to the master unit 10#0.

Then, the master unit that has received the transmission permission frame generates a plurality of data frames and adds the PLCP of the mixed mode to each of the generated data frames independently. Then, the master unit transmits each of the data frames to which the PLCP is added to the slave unit using multiplexing communication. For example, as illustrated in FIG. 15, the master unit 10#0 transmits a plurality of data frames DATA #01 to DATA #04 to which the PLCP of the mixed mode is added to the slave units 10#1 to #10#4 using frequency division multiplexing communication. Then, the PLCP of the mixed mode is added to each of frames to be exchanged later.

As described above, since the PLCP preamble is added to the frame each time communication is performed, there are cases in which an unnecessary PLCP preamble is transmitted. In this regard, the communication apparatus 10-4 according to the present embodiment is based on the communication apparatus according to the first embodiment, and uses an individual VSP as the PLCP of each of the frames to be multiplexed.

<5-1. Configuration of Communication Apparatus>

The communication apparatus 10-4 have substantially the same functional configuration as that of the first embodiment, except for a portion of the functions of the data processing unit 11 and the communication unit 12. Note that substantially the same functions as those of the first to third embodiments will not be described.

The modulation/demodulation unit 13 and the signal processing unit 16 in the communication unit 12 perform a process involved in frequency-division multiplexing. Specifically, the modulation/demodulation unit 13 divides a frame provided from the data processing unit 11 into portions, the number of which is equal to the number of subcarriers, and modulates each portion of the frame obtained by the division. Thereafter, the modulation/demodulation unit 13 combines signals obtained by the modulation, and provides the signal obtained by the combination to the signal processing unit 16. The signal processing unit 16 performs a process, such as addition of a guard interval, or the like, on the signal provided from the modulation/demodulation unit 13, and provides a signal obtained by the process, i.e., a symbol stream, to the radio interface unit 14.

The signal processing unit 16 performs a process, such as removal of a guard interval, or the like, on the symbol stream related to received waves provided from the radio interface unit 14, and provides a signal obtained by the process to the modulation/demodulation unit 13. The modulation/demodulation unit 13 extracts a subcarrier signal from the signal provided from the signal processing unit 16, and demodulates each subcarrier. Thereafter, the modulation/demodulation unit 13 combines frames obtained by the demodulation, and provides the combined frame to the data processing unit 11.

The data processing unit 11 generates a plurality of frames and adds the PLCP to each of the plurality of frames. Specifically, the data processing unit 11 generates frames destined for a plurality of communication apparatuses 10-3, and adds the PLCPs selected by the control unit 15 to the generated frames.

<5-2. Process of Communication Apparatus>

Figure 20:
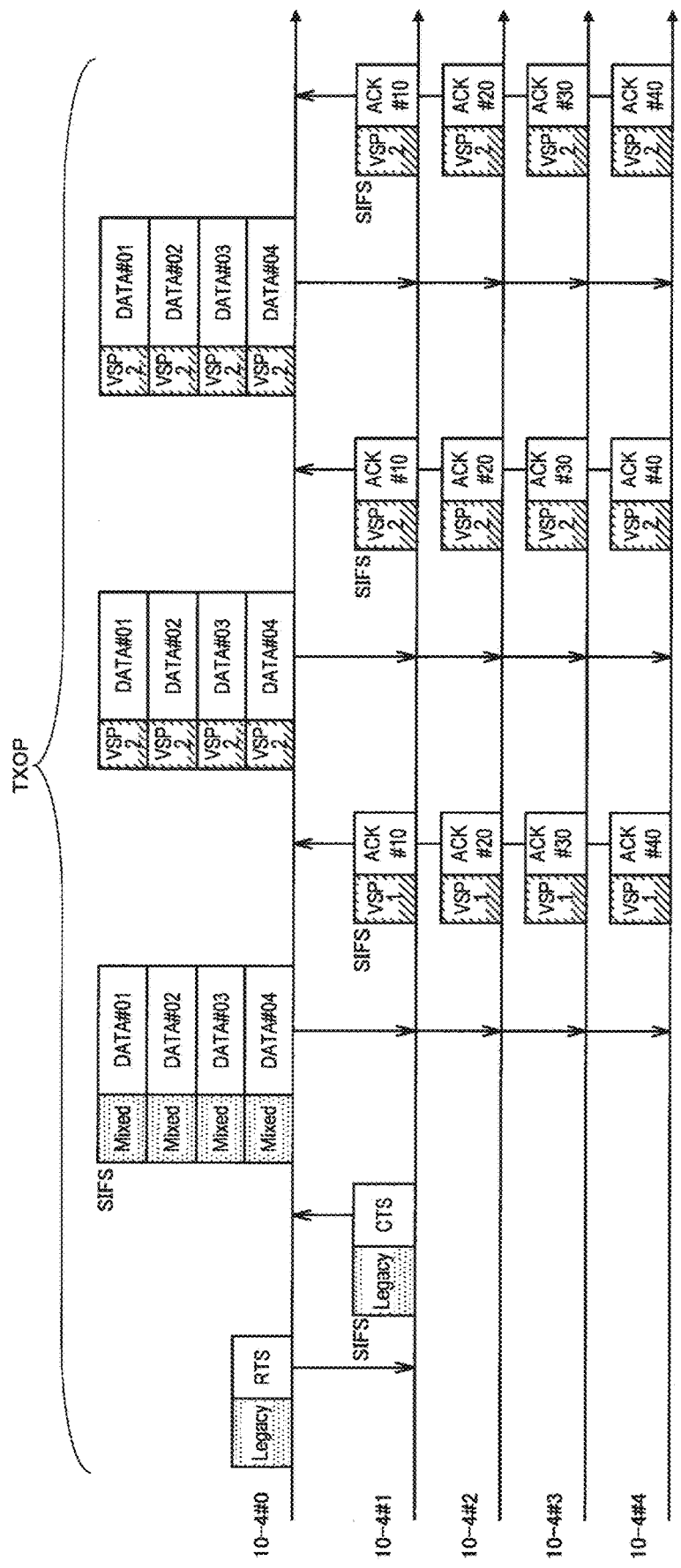
FIG. 20 is a diagram illustrating a frame exchange sequence for describing an example of a process of a communication system according to a fourth embodiment of the present disclosure.

Next, a specific example of communication performed in the communication system according to the present embodiment will be described with reference to FIG. 20. FIG. 20 is a diagram illustrating an example of a frame exchange sequence performed in the communication system according to the present embodiment. Since the flow of a process of the communication apparatus 10-4 is substantially the same as the flow of the process according to the first embodiment, description thereof is omitted. Further, descriptions of processes that are substantially the same as the processes of the first and third embodiments will be omitted.

(Specific Example of Communication)

First, a master unit 10-4#0 transmits the legacy mode transmission permission request frame to a slave unit 10-4#1. Then, the slave unit 10-4#1 that has received the frame transmits the legacy mode transmission permission frame to the master unit 10-4#0.

Then, the master unit 10-4#0 that has received the transmission permission frame generates the data frames destined for the slave units 10-4#1 to 10-4#4, and adds the PLCP of the mixed mode to each of the data frames. Then, the master unit 10-4#0 transmits the frames to the slave units 10-4#1 to 10-4#4 using frequency division multiplexing communication. Then, each of the slave units 10-4#1 to 10-4#4 that have received the frame transmits the ACK frame which is the VSP1 frame to the master unit 10-4#0.

Then, the master unit 10-4#0 generates the data frames destined for the slave units 10-4#1 to 10-4#4, and transmits the frames to which VSP2 common to the data frames is divided to the slave units 10-4#1 to 10-4#4 using frequency division multiplexing communication. Then, each of the slave units 10-4#1 to 10-4#4 that have received the frame transmits the ACK frame to which VSP2 is added to the master unit 10-4#0.

As described above, according to the fourth embodiment of the present disclosure, the communication apparatus 10-3 generates a plurality of VSP frames and transmits the plurality of VSP frames using frequency division multiplexing communication. Therefore, since the PLCP preamble is reduced, it is possible to reduce the overhead of communication and improve the use efficiency of wireless communication resources.

Further, the communication apparatus 10-4 adds the PLCP to each of the frames to be multiplexed. Thus, since different PLCPs can be added to the frames destined for the communication apparatuses 10-3 that differ in the result of the PLCP selection process, when some frames do not satisfy a VSP addition condition, the case in which the PLCP of the related art is added to all the frames is reduced. Further, it is possible to further promote the reduction in the overhead of communication.

6. APPLICATION EXAMPLE

The technology according to the embodiments of the disclosure can be applied to various products. For example, a slave unit among the communication apparatus 10 may be realized as mobile terminals such as smartphones, tablet PCs (Personal Computers), notebook PCs, portable game terminals, or digital cameras, fixed-type terminals such as television receivers, printers, digital scanners, or network storages, or car-mounted terminals such as car navigation devices. In addition, the slave unit may be realized as terminals that perform M2M (Machine to Machine) communication (also referred to as MTC (Machine Type Communication) terminals) such as smart meters, vending machines, remotely controlled surveillance devices, or POS (Point Of Sale) terminals. Furthermore, the slave unit may be wireless communication modules mounted in such terminals (for example, integrated circuit modules configured by one die).

On the other hand, for example, a master unit among the communication apparatus 10 may be realized as a wireless LAN access point (also referred to as a wireless base station) which has a router function or does not have a router function. The master unit may be realized as a mobile wireless LAN router. The master unit may also be a wireless communication module (for example, an integrated circuit module configured with one die) mounted on the device.

6-1. First Application Example

Figure 21:
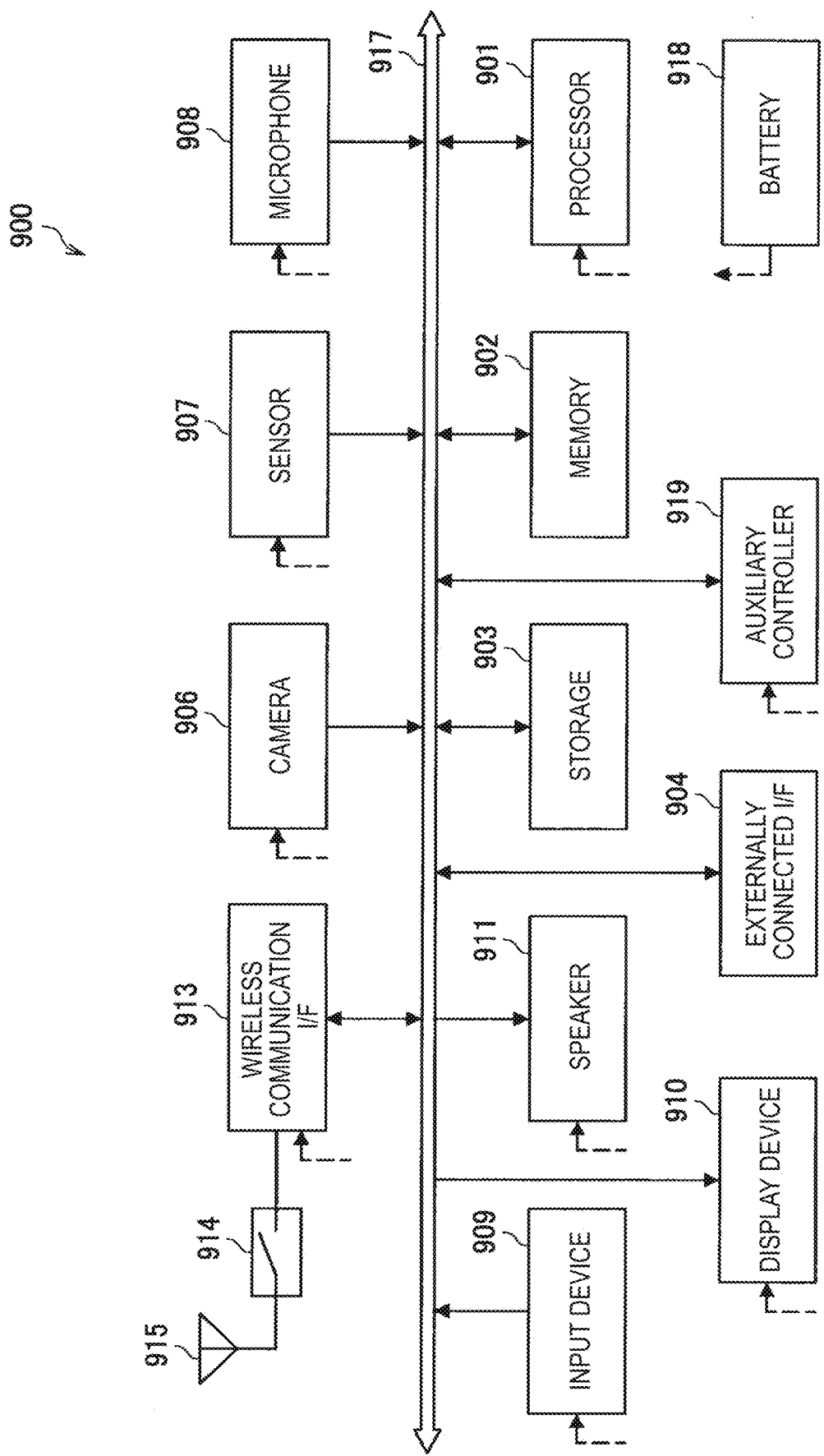
FIG. 21 is a block diagram illustrating an example schematic configuration of a smartphone.

FIG. 21 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a CPU (Central Processing Unit) or an SoC (System on Chip), and controls functions of an application layer and other layers of the smartphone 900. The memory 902 includes a RAM (Random Access Memory) and a ROM (Read Only Memory), and stores programs executed by the processor 901 and data. The storage 903 can include a storage medium such as a semiconductor memory or a hard disk. The externally connected interface 904 is an interface for connecting an externally attached device such as a memory card or a USB (Universal Serial Bus) device to the smartphone 900.

The camera 906 has an image sensor, for example, a CCD (Charge Coupled Device) or a CMOS (Complementary Metal Oxide Semiconductor), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad, to execute the wireless LAN communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Wi-Fi Direct is different from the ad hoc mode, and thus one of two terminals operates as an access point. However, communication is performed directly between the terminals. The wireless communication interface 913 can typically include a baseband processor, an RF (Radio Frequency) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 21. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 21 via power supply lines partially indicated by dashed lines in the drawing. The auxiliary controller 919 causes, for example, necessary minimum functions of the smartphone 900 to be operated in a sleep mode.

In the smartphone 900 shown in FIG. 21, the data processing unit 11, the communication unit 12, and the control unit 15 described with reference to FIG. 4 may be mounted in the wireless communication interface 913. At least some of the functions may be mounted on the processor 901 or the auxiliary controller 919. For example, the control unit 15 causes the frame not including the transmitted training signal to be transmitted to the communication unit 12, and thus it is possible to reduce the overhead of communication.

Note that the smartphone 900 may operate as a wireless access point (software AP) as the processor 901 executes the function of an access point at an application level. In addition, the wireless communication interface 913 may have the function of a wireless access point.

6-2. Second Application Example

Figure 22:
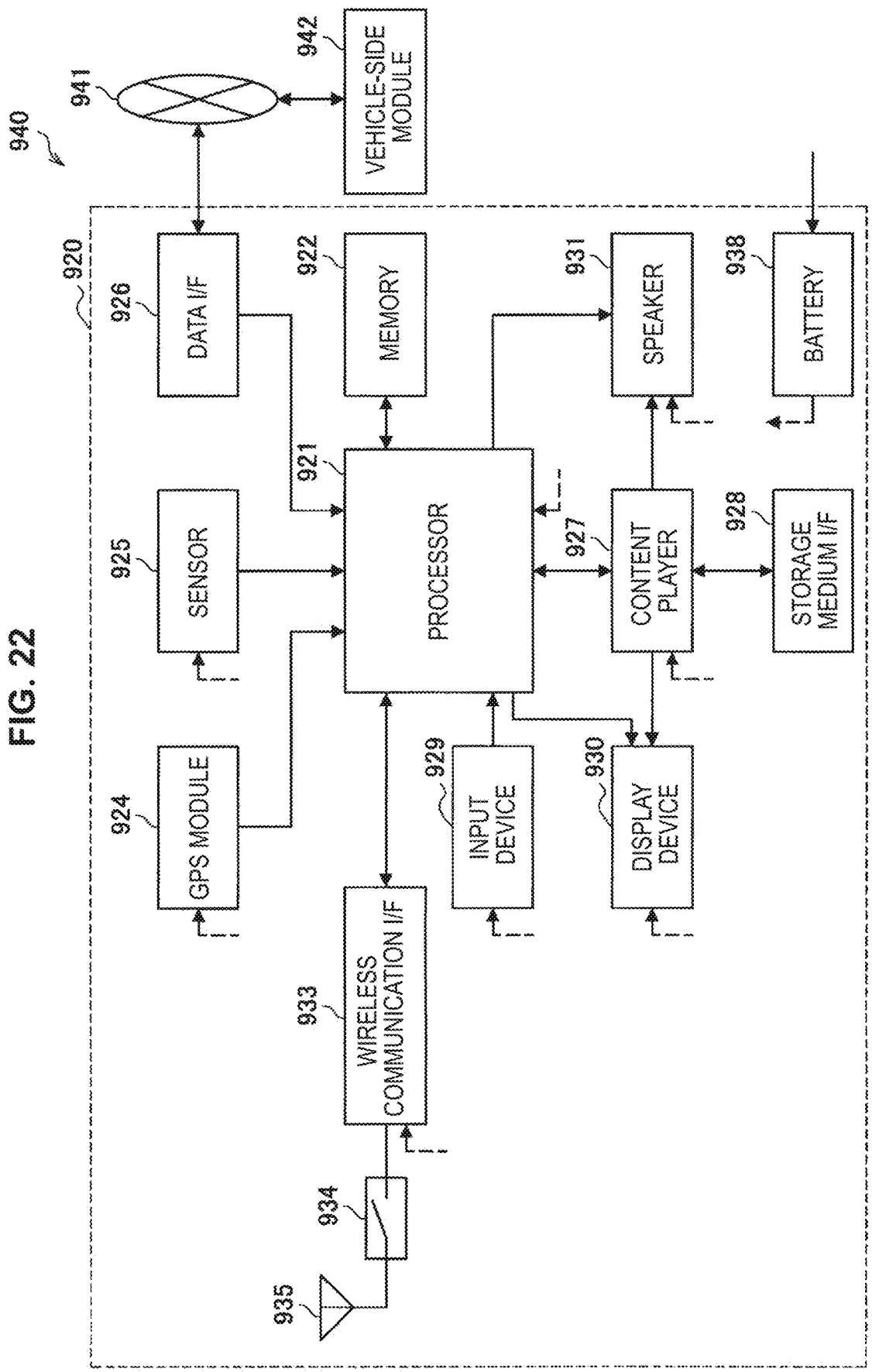
FIG. 22 is a block diagram illustrating an example schematic configuration of a car navigation device.

FIG. 22 is a block diagram showing an example of a schematic configuration of a car navigation device 920 to which the technology of the present disclosure can be applied. The car navigation device 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes a RAM and a ROM storing programs executed by the processor 921 and data.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a pneumatic sensor, and the like. The data interface 926 is connected to an in-vehicle network 941 via, for example, a terminal that is not illustrated to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad, to execute wireless LAN communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation device 920 may include a plurality of antennas, without being limited to the example of FIG. 22. In this case, the antenna switch 934 may be omitted from the configuration of the car navigation device 920.

The battery 938 supplies electric power to each of the blocks of the car navigation device 920 shown in FIG. 22 via power supply lines partially indicated by dashed lines in the drawing. In addition, the battery 938 accumulates electric power supplied from the vehicle.

In the car navigation device 920 shown in FIG. 22, the data processing unit 11, the communication unit 12, and the control unit 15 described with reference to FIG. 4 may be mounted in the wireless communication interface 933. At least some of the functions may be mounted on the processor 921. For example, the control unit 15 causes the frame not including the transmitted training signal to be transmitted to the communication unit 12, and thus it is possible to reduce the overhead of communication.

Further, the wireless communication interface 933 may operate as the master unit described above and may provide a wireless connection to a terminal of a user riding in a vehicle. At that time, for example, the overhead of communication in the wireless connection is reduced, and the communication time is reduced, and thus it is possible to suppress the power consumption of the terminal of the user.

The technology of the present disclosure may be realized as an in-vehicle system (or a vehicle) 940 including one or more blocks of the above-described car navigation device 920, an in-vehicle network 941, and a vehicle-side module 942. The vehicle-side module 942 generates vehicle-side data such as a vehicle speed, the number of engine rotations, or failure information and outputs the generated data to the in-vehicle network 941.

6-3. Third Application Example

Figure 23:
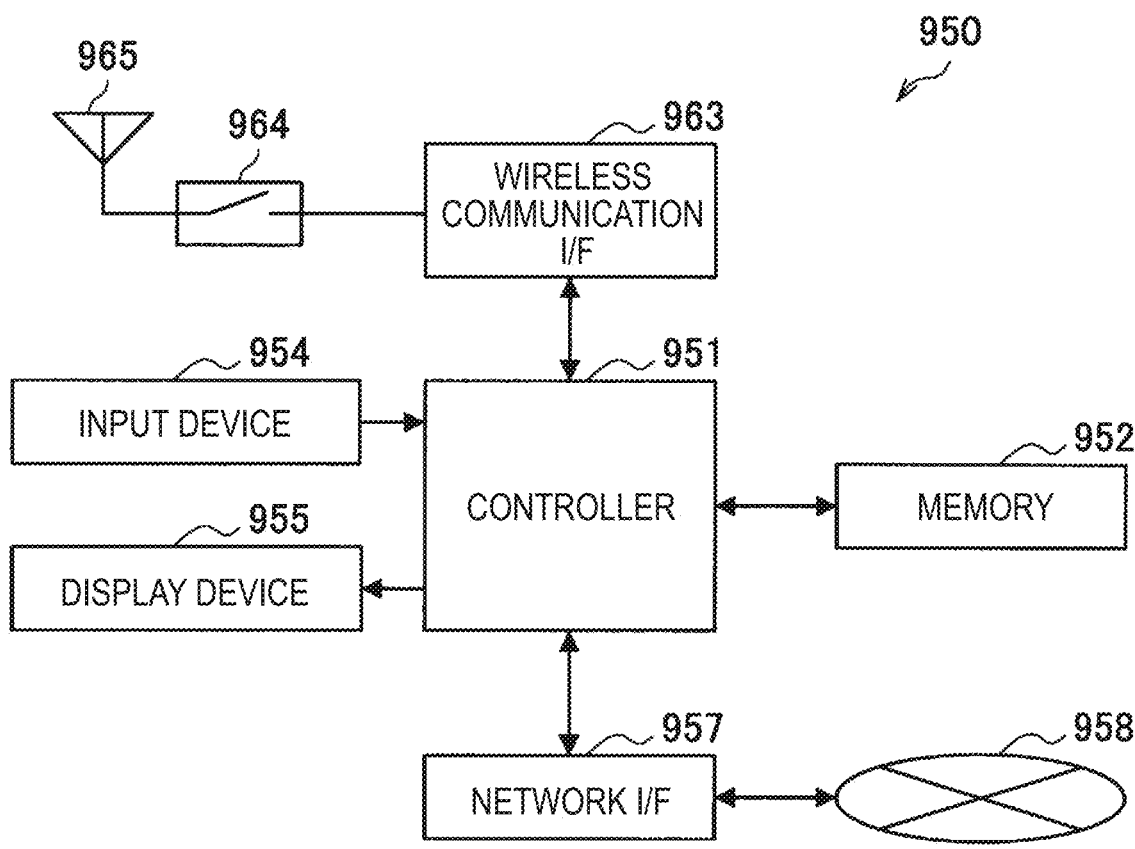
FIG. 23 is a block diagram illustrating an example schematic configuration of a wireless access point.

FIG. 23 is a block diagram showing an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes a RAM and a ROM and stores a program executed by the controller 951 and various kinds of control data (for example, a terminal list, a routing table, an encryption key, security settings, and a log).

The input device 954 includes, for example, a button or a switch, and receives a manipulation from a user. The display device 955 includes an LED lamp and displays an operation status of the wireless access point 950.

The network interface 957 is a wired communication interface that connects the wireless access point 950 to a wired communication network 958. The network interface 957 may include a plurality of connection terminals. The wired communication network 958 may be a LAN such as Ethernet (registered trademark) or may be a Wide Area Network (WAN).

The wireless communication interface 963 supports one or more wireless LAN standards of IEEE 802.11a, 11b, 11g, 11n, 11ac, and 11ad, to supply wireless connection to a nearby terminal as an access point. The wireless communication interface 963 can typically include a baseband processor, an RF circuit, and a power amplifier. The wireless communication interface 963 may be a one-chip module in which a memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

In the wireless access point 950 shown in FIG. 23, the data processing unit 11, the communication unit 12, and the control unit 15 described with reference to FIG. 4 may be mounted on the wireless communication interface 963. At least some of the functions may be mounted on the controller 951. For example, the control unit 15 causes the frame not including the transmitted training signal to be transmitted to the communication unit 12, and thus it is possible to reduce the overhead of communication.

7. CONCLUSION

According to the first embodiment of the present disclosure, the already transmitted training signal is not included in the PLCP, and thus it is possible to reduce the overhead of communication while suppressing influence on the frame reception process.

According to the second embodiment of the present disclosure, the PLCP is selected on the basis of the use request of which the reception side notifies, and thus more appropriate PLCP is selected than when the PLCP is selected through the determination of the transmission side, and it is possible to suppress the occurrence of the frame reception failure which is caused by the erroneous selection of the PLCP.

Further, according to the third embodiment of the present disclosure, the PLCP preamble is reduced even in one-to-many communication, and thus it is possible to reduce the overhead of communication and improve the use efficiency of the wireless communication resources.

Further, according to the fourth embodiment of the present disclosure, the PLCP preamble is reduced, and thus it is possible to reduce the overhead of communication and improve the use efficiency of wireless communication resources.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the first and second embodiments, the example in which the frame is transmitted from the master unit to the slave unit has been described, but the present technology is not limited to this example. For example, using the Reverse Direction function, a frame may be transmitted to the master unit continuously from the slave unit that has received the frame from the master unit.

In the above embodiments, VSP1, VSP2, and VSP3 have been described as the examples of the PLCP (VSP) in which a part or all of the training signal is omitted, but the VSP is not limited thereto, and various PLCPs in which the training signal is omitted so that the frame reception process can be performed may be employed as the VSP.

Further, not only a process in which steps shown in the flowcharts of the above embodiments are performed in a time-series manner in accordance with a described sequence but also a process in which the steps are not necessarily processed in a time-series manner but are executed in parallel or individually is included. Also, it is self-evident that even steps processed in a time-series manner can be appropriately changed in sequence depending on circumstances.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication apparatus, including:

a processing unit configured to select one of a frame of a first format including a training signal and a frame of a second format not including a first field which is at least a part of the training signal, and generate the frame of the selected format; and a communication unit configured to transmit the frame of the first format or the frame of the second format.

(2)

The communication apparatus according to (1), wherein the first field includes a training signal for backward compatibility.

(3)

The communication apparatus according to (1), wherein the frame of the second format is configured with a signal including information related to a data part of a frame and the data part, and does not include the training signal.

(4)

The communication apparatus according to (1), wherein the frame of the second format is configured with only a data part of a frame, and does not include a signal including information related to the data part and the training signal.

(5)

The communication apparatus according to any one of (1) to (3), wherein the processing unit selects the frame of the second format when a first condition related to a transmission time of a frame to be transmitted is satisfied.

(6)

The communication apparatus according to (5), wherein the first condition includes that the transmission time of the frame to be transmitted be before a predetermined time elapses after the frame of the first format is transmitted to a destination of the frame to be transmitted.

(7)

The communication apparatus according to (6), wherein the predetermined time is a time in which a communication synchronization error falls within a predetermined range.

(8)

The communication apparatus according to (6), wherein the predetermined time is a time shorter than the other time among times decided by the transmission destination of the frame of the first format and the communication apparatus.

(9)

The communication apparatus according to any one of (5) to (8), wherein the first condition includes that the transmission time of the frame to be transmitted be known to the destination of the frame to be transmitted.

(10)

The communication apparatus according to (9), wherein being known includes that transmission of the frame to be transmitted be permitted when a predetermined time elapses after reception of a frame received later than other frames.

(11)

The communication apparatus according to (9), wherein being known includes that a frame received from another communication apparatus indicates an immediate response request.

(12)

The communication apparatus according to any one of (5) to (11), wherein the first condition includes that it be a transmission suppression period indicated by a signal which is exchanged between the destination of the frame to be transmitted and the communication apparatus and used for suppressing transmission of communication apparatuses other than the destination of the frame to be transmitted and the communication apparatus.

(13)

The communication apparatus according to any one of (5) to (12), wherein the first condition includes that a transmission period length of the frame to be transmitted be a threshold value or less.

(14)

The communication apparatus according to any one of (5) to (13), wherein, when frames to be transmitted to a plurality of destinations are multiplexed, the processing unit selects the frame of the second format when the first condition is satisfied for all the plurality of destinations.

(15)

The communication apparatus according to any one of (1) to (4), wherein the processing unit selects the frame of the second format when a frame including a use request for the frame of the second format is received.

(16)

The communication apparatus according to (15), wherein the communication unit receives the frame including the use request for the frame of the second format which is transmitted when a second condition related to a transmission time of a frame is satisfied.

(17)

The communication apparatus according to (16), wherein the second condition includes that a transmission time of the frame including the use request be before a predetermined time elapses after the frame of the first format is received from a destination of the frame including the use request, and that a transmission time of a frame received as a response to the frame including the use request be known to a transmission source of the frame including the use request.

(18)

A communication apparatus, including:

a communication unit configured to receive a frame of a first format including a training signal and a frame of a second format not including a first field which is at least a part of the training signal.

(19)

The communication apparatus according to (18), further including:

a processing unit configured to select one of the frame of the first format and the frame of the second format as a frame to be received, on the basis of a use request included in a transmitted frame, wherein the communication unit receives the frame of the selected format.

(20)
A communication method, including:
selecting one of a frame of a first format including a training signal and a frame of a second format not including a first field which is at least a part of the training signal, and generating the frame of the selected format; and
transmitting the frame of the first format or the frame of the second format.

REFERENCE SIGNS LIST 10 communication apparatus
11 data processing unit
12 communication unit
13 modulation/demodulation unit
14 radio interface unit
15 control unit
16 signal processing unit

The invention claimed is:

1. A communication apparatus comprising circuitry configured to:
establish a communication link with a second communication apparatus;
determine whether or not the second communication apparatus supports a very short physical layer convergence protocol ("VSP");
calculate a candidate time length for communications with the second communication apparatus; and
transmit information indicating the candidate time length to the second communication apparatus in an exchange frame,
wherein the candidate time length indicates an estimated range of a communication synchronization error with the second communication apparatus.

2. The communication apparatus of claim 1; wherein the exchange frame comprises a header and a frame body.

3. The communication apparatus of claim 2, wherein the exchange frame further comprises a physical layer convergence protocol (PLCP).

4. The communication apparatus of claim 3, wherein the information indicating the candidate time length is transmitted in the frame body.

5. The communication apparatus of claim 4, wherein the information indicating the candidate time length is configured with an action category and an action identification.

6. The communication apparatus of claim 1, wherein the circuitry is further configured to generate a frame with a first format when the candidate time length has not elapsed since transmission of a previous frame to the second communication apparatus.

7. The communication apparatus of claim 6, wherein the first format is the VSP.

8. The communication apparatus of claim 6, wherein the circuitry is further configured to generate the frame with a second format when the candidate time length has elapsed since transmission of the previous frame to the second communication apparatus.

9. The communication apparatus of claim 1, wherein the circuitry is further configured to:
in a first case when it is determined that the second communication apparatus does not support the VSP, turn off a VSP setting.

10. The communication apparatus of claim 9, wherein the circuitry is further configured to:
in a second case when it is determined that the second communication apparatus does support the VSP, turn on the VSP setting.

11. A method of communication for a communication apparatus, the method comprising:
establishing a communication link With a second communication apparatus;
determining whether or not the second communication apparatus supports a very short physical layer convergence protocol ("VSP");
calculating a candidate time length for communications with the second communication apparatus; and
transmitting information indicating the candidate time length to the second communication apparatus in an exchange frame,
wherein the candidate time length indicates an estimated range of a communication synchronization error with the second communication apparatus.

12. The method of claim 11, wherein the exchange frame comprises a header and a frame body.

13. The method of claim 12, wherein the exchange frame further comprises a physical layer convergence protocol (PLCP).

14. The method of claim 13, wherein the information indicating the candidate time length is transmitted in the frame body.

15. The method of claim 14, wherein the information, indicating the candidate time length is configured with an action category and an action identification.

16. The method of claim 11, further comprising:
in a first case when it is determined that the second communication apparatus does not support the VSP, turning off a VSP setting.

17. The method of claim 16, further comprising:
in a second case when it is determined that the second communication apparatus does support the VSP, turning on the VSP setting.

18. The method of claim 11, further comprising generating a frame with a first format when the candidate time length has not elapsed since transmission of a previous frame to the second communication apparatus.

19. The method of claim 18, wherein the first format is the VSP.

20. The method of claim 18, further comprising generating the frame with a second format when the candidate time length has elapsed since transmission of the previous frame to the second communication apparatus.

* * * * *